US012792707B2

(12) United States Patent
Hoshino

(10) Patent No.: US 12,792,707 B2
(45) Date of Patent: Nov. 10, 2026

(54) IMAGE TARGET AUTHENTICATION BASED ON CONTINUOUS FEATURE QUANTITY

(71) Applicant: NEC Corporation, Tokyo (JP)

(72) Inventor: Tetsuro Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 18/269,794

(22) PCT Filed: Nov. 17, 2021

(86) PCT No.: PCT/JP2021/042188
§ 371 (c)(1),
(2) Date: Jun. 27, 2023

(87) PCT Pub. No.: WO2022/145143
PCT Pub. Date: Jul. 7, 2022

(65) Prior Publication Data

US 2024/0061920 A1 Feb. 22, 2024

(30) Foreign Application Priority Data

Dec. 28, 2020 (JP) ................................ 2020-218564

(51) Int. Cl.
*G06F 21/32* (2013.01)
*G06T 7/20* (2017.01)
*G06V 10/44* (2022.01)

(52) U.S. Cl.
CPC ................ *G06F 21/32* (2013.01); *G06T 7/20* (2013.01); *G06V 10/44* (2022.01)

(58) Field of Classification Search
CPC ........... G06F 21/32; G06T 7/20; G06V 10/44
(Continued)

(56) References Cited

U.S. PATENT DOCUMENTS 8,330,800 B2 * 12/2012 Endo ......................... G06T 7/60 348/46
9,607,138 B1 * 3/2017 Baldwin ............... H04W 12/06
(Continued)

FOREIGN PATENT DOCUMENTS

JP 2007249587 A * 9/2007
JP 2011-067371 A 4/2011
(Continued)

OTHER PUBLICATIONS

English machine-translation of JP-2007249587-A using Clarivate Analytics, pp. 1-15 (Year: 2007).*
(Continued)

*Primary Examiner* — David P Zarka
(74) *Attorney, Agent, or Firm* — Sughrue Mion, PLLC

(57) ABSTRACT

An information processing system includes: an imaging apparatus that generates a plurality of images, by imaging the target continuously in time series; and an information processing apparatus that authenticates the target by using at least one of the plurality of images. The information processing apparatus includes: an extraction unit that extracts, from each of the plurality of images, a feature quantity of target that changes in accordance with a movement of the target; and an authentication unit that determines that authentication of the target is failed, when the feature quantity changes discontinuously in time series among the plurality of images.

6 Claims, 7 Drawing Sheets

(58) Field of Classification Search
USPC .......................................................... 713/186
See application file for complete search history.

(56) References Cited

U.S. PATENT DOCUMENTS

| | | | | |
|---|---|---|---|---|
| 11,507,646 | B1 * | 11/2022 | Baldwin | G06V 40/40 |
| 2007/0260116 | A1 * | 11/2007 | Shigemori | A61B 5/073 600/117 |
| 2014/0039317 | A1 * | 2/2014 | Sato | A61B 8/5246 600/443 |
| 2016/0140405 | A1 * | 5/2016 | Graumann | H04L 9/3231 382/118 |
| 2016/0148066 | A1 * | 5/2016 | Duenias | H04N 23/745 382/115 |
| 2016/0294824 | A1 | 10/2016 | Sezille | |
| 2017/0195046 | A1 * | 7/2017 | Cheon | H04L 12/2809 |
| 2018/0307815 | A1 * | 10/2018 | Samadani | G06V 40/45 |
| 2018/0325380 | A1 * | 11/2018 | Abe | A61B 5/0095 |
| 2018/0349682 | A1 * | 12/2018 | Wong | G06V 40/172 |
| 2019/0026544 | A1 * | 1/2019 | Hua | A61B 5/1128 |
| 2019/0266427 | A1 * | 8/2019 | Chang | G06V 40/70 |
| 2019/0377959 | A1 * | 12/2019 | Marano | G06Q 50/40 |
| 2020/0019686 | A1 * | 1/2020 | Min | H04W 12/06 |
| 2021/0144342 | A1 * | 5/2021 | Isberg | H04N 5/783 |
| 2021/0406567 | A1 * | 12/2021 | Shibata | H04L 63/0861 |
| 2023/0142255 | A1 * | 5/2023 | Kajiki | H04L 9/3231 382/118 |

FOREIGN PATENT DOCUMENTS

| | | | | | |
|---|---|---|---|---|---|
| JP | 2013-128572 | A | | 7/2013 | |
| JP | 2016526211 | A | * | 9/2016 | H04W 12/06 |
| JP | 6727684 | B1 | | 7/2020 | |
| KR | 20230091100 | A | * | 6/2023 | H04N 5/04 |
| WO | 2014/186374 | A1 | | 11/2014 | |

OTHER PUBLICATIONS

International Search Report for PCT Application No. PCT/JP2021/042188, mailed on Feb. 1, 2022.

European Search Report for EP Application No. 21915004.2, dated on May 10, 2024.

JP Office Action for JP Application No. 2024-217001, mailed on Sep. 16, 2025 with English Translation.

* cited by examiner

IMAGE TARGET AUTHENTICATION BASED ON CONTINUOUS FEATURE QUANTITY

This application is a National Stage Entry of PCT/JP2021/042188 filed on Nov. 17, 2021, which claims priority from Japanese Patent Application 2020-218564 filed on Dec. 28, 2020, the contents of all of which are incorporated herein by reference, in their entirety.

TECHNICAL FIELD

This disclosure relates to an information processing system, an information processing apparatus, an information processing method, and a recording medium that authenticate a target, for example.

BACKGROUND ART

An information processing apparatus that authenticates a person by using an image generated by an imaging apparatus that images the person's face is required to prevent spoofing. An example of the information processing apparatus for preventing such spoofing is described in Patent Literatures 1 and 2.

As a background art document related to this disclosure, Patent Literature 3 is cited.

CITATION LIST

Patent Literature

Patent Literature 1: JP2011-067371A
Patent Literature 2: JP2013-128572A
Patent Literature 3: JP6727684B

SUMMARY

Technical Problem

It is an example object of this disclosure to provide an information processing system, an information processing apparatus, an information processing method, and a recording medium that aim to improve the techniques/technologies described in Citation List.

Solution to Problem

An information processing system according to an example aspect of this disclosure includes: an imaging apparatus that generates a plurality of images in which a target appears, by imaging the target continuously in time series; and an information processing apparatus that authenticates the target by using at least one of the plurality of images, the information processing apparatus including: an extraction unit that extracts, from each of the plurality of images, a feature quantity of target that changes in accordance with a movement of the target; and an authentication unit that determines that authentication of the target is failed, when the feature quantity changes discontinuously in time series among the plurality of images.

An information processing apparatus according to an example aspect of this disclosure includes: an extraction unit that extracts, from each of a plurality of images in which a target appears and which are generated by that an imaging apparatus images the target continuously in time series, a feature quantity of the target that changes in accordance with a movement of the target; and an authentication unit that determines that authentication of the target is failed, when the feature quantity changes discontinuously in time series among the plurality of images.

An information processing method according to an example aspect of this disclosure includes: generating a plurality of images in which a target appears, by imaging the target continuously in time series; extracting, from each of the plurality of images, a feature quantity of target that changes in accordance with a movement of the target; and determining that authentication of the target is failed, when the feature quantity changes discontinuously in time series among the plurality of images.

A recording medium according to an example aspect of this disclosure is a recording medium on which a computer program that allows a computer to execute an information processing method is recorded, the information processing method including: generating a plurality of images in which a target appears, by imaging the target continuously in time series; extracting, from each of the plurality of images, a feature quantity of target that changes in accordance with a movement of the target; and determining that authentication of the target is failed, when the feature quantity changes discontinuously in time series among the plurality of images.

DESCRIPTION OF EXAMPLE EMBODIMENTS

Figure 1:
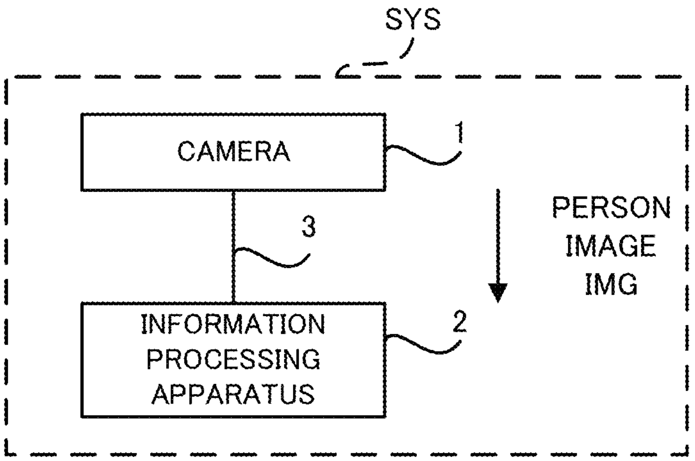
FIG. 1 is a block diagram illustrating an overall configuration of an information processing system according to a first example embodiment.

Hereinafter, an information processing system, an information processing apparatus, an information processing method, and a recording medium according to example embodiments will be described with reference to the drawings. The following describes an information processing system SYS to which an information processing system, an information processing apparatus, an information processing method, and a recording medium according to the example embodiments are applied.

(1) Information Processing System SYS in First Example Embodiment

First, the information processing system SYS in the first example embodiment will be described. In the following explanation, the information processing system SYS in the first example embodiment is referred to as an "information processing system SYSa."

(1-1) Outline of Information Processing System SYSa

The information processing system SYSa uses at least one of a plurality of images generated by that a camera 1 (refer to FIG. 1) images a target that is in front of the camera 1 (hereinafter referred to as an "authentication target") continuously in time series, thereby to authenticate the target that appears in the image. For example, the information processing system SYSa may authenticate the authentication target by performing a collation/verification process of determining whether or not the target that appears in the image (hereafter referred to as an "imaged target") matches a target registered in advance (hereafter referred to as a "registered target") in the information processing system SYSa.

The target may include a person, for example. The target may include an animal that is different from the person (e.g., at least one of a mammal such as a dog and a cat, a bird such as a sparrow, a reptile such as a snake, an amphibian such as a frog, and fish such as goldfish). The target may include an inanimate object. The inanimate object may include a robot that mimics a person or an animal.

The following describes an example in which the target is a person. In this case, the information processing system SYSa uses at least one of a plurality of person images IMG generated by that the camera 1 (refer to FIG. 1 described later) images a person who is in front of the camera 1 continuously in time series, thereby to authenticate the person who appears in the person images IMG. For example, the information processing system SYSa may authenticate an authentication target person by performing a collation/verification process of determining whether or not the person who appears in each of the plurality of person images IMG (hereinafter referred to as an "imaged person") matches a person registered in advance (hereinafter referred to as a "registrant") in the information processing system SYSa.

Here, the camera 1 typically images the authentication target person who is actually in front of the camera 1. For this reason, the imaged person that appears in the person images IMG normally matches the authentication target person who is actually in front of the camera 1. In this case, the collation/verification process of determining whether or not the imaged person matches the registrant, is equivalent to a collation/verification process of determining whether or not the authentication target person matches the registrant. For this reason, when determining that the imaged person matches the registrant, as it is equivalent to determining that the authentication target person matches the registrant, the information processing system SYSa determines that the authentication of the authentication target person (i.e., the authentication of the imaged person who appears in the person images IMG, and the same applies then) is successful. On the other hand, when determining that the imaged person does not match the registrant, as it is equivalent to determining that the authentication target person does not match the registrant, the information processing system SYSa determines that the authentication of the authentication target person is failed.

On the other hand, a malicious authentication target person possibly makes the camera capture an image including the registrant who is different from the authentication target person so as to pretend to be the registrant who is different from the authentication target person. Specifically, the malicious authentication target person who is in front of the camera 1 possibly place a portable display (e.g., a display of a tablet terminal or a smartphone) on which the image including the registrant is displayed, in front of the camera 1. Consequently, the camera 1 captures an image of the registrant displayed on the display, instead of the authentication target person who is actually in front of the camera 1. In this case, even though the registrant is not actually in front of the camera 1, the registrant appears in the person images IMG generated by the camera 1, as the imaged person. Consequently, by performing the collation/verification process, the information processing system SYSa may determine that the imaged person who appears in the person images IMG matches the registrant. For this reason, the information processing system SYSa may erroneously determine that the authentication of the authentication target person is successful. Specifically, the information processing system SYSa may erroneously determine that the authentication target person who is actually in front of the camera 1 matches the registrant, even though the registrant is not actually in front of the camera. In other words, the information processing system SYSa may erroneously determine that the authentication of the authentication target person is successful, even though it should determine that the authentication of the authentication target person is failed because the authentication target person that is different from the registrant is in front of the camera 1.

For this reason, the information processing system SYSa that authenticates the authentication target person is required to prevent "spoofing" corresponding to an action of the malicious authentication target person pretending to be the registrant who is different from the authentication target person. Therefore, the information processing system SYSa in the first example embodiment performs an authentication operation for authenticating the authentication target person while preventing the spoofing. Especially in the first example embodiment, the information processing system SYSa performs an authentication operation for authenticating the authentication target person while preventing the spoofing corresponding to an action of the authentication target person pretending to be the registrant, by using a display that displays an image of the registrant.

Specifically, as described in detail later, the information processing system SYSa determines that the authentication of the authentication target person is failed when there is no continuity in a movement of the imaged person among the plurality of person images IMG. Therefore, in the first example embodiment, when there is no continuity in the movement of the imaged person among the plurality of person images IMG, the information processing system SYSa determines that the authentication of the authentication target person (i.e., the authentication of the imaged person) is failed, even when determining that the imaged person matches the registrant.

Hereinafter, a configuration and operation of the information processing system SYSa that performs such an authentication operation will be described in order.

(1-2) Configuration of Information Processing System SYSa

First, the configuration of the information processing system SYSa in the first example embodiment will be described.

(1-2-1) Overall Structure of Information Processing System SYSa

First, a overall configuration of the information processing system SYSa in the first example embodiment will be described with reference to FIG. 1. FIG. 1 is a block diagram illustrating the overall configuration of the information processing system SYSa according to the first example embodiment.

As illustrated in FIG. 1, the information processing system SYSa includes the camera 1 and an information processing apparatus 2. The information processing system SYSa may include a single the camera 1 or may include a plurality of cameras 1. The camera 1 and the information processing apparatus 2 are allowed to communicate with each other through a communication network 3. The communication network 3 may include a wired communication network. The communication network 3 may include a wireless communication network.

The camera 1 is an imaging apparatus that is configured to image an imaging target range continuously in time series. The camera 1 performs an imaging process that is a part of the authentication operation performed by the information processing system SYSa. The imaging processing includes a process of generating an image in which the imaging target range appears by imaging the imaging target range.

Typically, the authentication target person who is actually in front of the camera 1, is in the imaging target range. In this case, the camera 1 generates a plurality of person images IMG in which the authentication target person appears as the authentication target person, by imaging the authentication target person continuously in time series. Alternatively, as described above, when the authentication target person pretends to be the registrant by using the display that displays the image of the registrant, the display (especially, a display screen thereof) that displays the image of the registrant is in the imaging target range. In this case, the camera 1 generates a plurality of person images IMG in which the registrant who is different from the authentication target person appears as the imaged person, by continuously capturing the image of the registrant displayed on the display.

The camera 1 images the imaging target range at a predetermined imaging rate continuously in time series. The imaging rate may indicate the number of times that the camera 1 images the imaging target range per unit time. For example, the camera 1 may image a scene in the imaging target range continuously in time series at an imaging rate of 30 [fps (frame per second)]. An imaging rate of x [fps] (x is a positive real number) means an imaging rate at which the imaging target range can be imaged x times per second (i.e., x person images IMG can be generated per second).

The camera 1 outputs the generated person images IMG to the information processing apparatus 2. Specifically, the camera 1 transmits the generated person images IMG to the information processing apparatus 2 through the communication network 3.

The information processing apparatus 2 receives the plurality of person images IMG transmitted from the camera 1 through the communication network 3. The information processing apparatus 2 performs an authentication process that is a part of the authentication operation performed by the information processing system SYSa by using the received person images IMG. The authentication process is a process of authenticating the authentication target person while preventing the spoofing, by using the plurality of person images IMG. Especially in the first example embodiment, the authentication process includes a continuity determination process of determining whether or not there is a continuity in the movement of the imaged person among the plurality of person images IMG. As a result of the continuity determination process, when determining that there is no continuity in the movement of the imaged person among the plurality of person images IMG, the information processing apparatus 2 determines that the authentication of the authentication target person is failed, as described above. The details of the configuration of the information processing apparatus 2 and the authentication process performed by the information processing apparatus 2 (i.e., a part of the authentication operation) will be described in detail later with reference to the drawings, and a description thereof will be omitted here.

When the information processing system SYSa includes a plurality of cameras 1 as described above, the information processing apparatus 2 may separately perform the authentication process for each of the cameras 1. For example, the information processing apparatus 2 may perform a first authentication process for authenticating the authentication target person who is in front of a first camera 1 of the plurality of cameras 1, by using a plurality of person images IMG transmitted from the first camera 1. For example, the information processing apparatus 2 may perform a second authentication process for authenticating the authentication target person who is in front of a second camera 1 of the plurality of cameras 1, by using a plurality of person images IMG transmitted from the second camera 1 that is different from the first camera 1, in parallel with or before or after the first authentication process.

Such an information processing system SYSa may perform the authentication operation to determine whether or not to allow the authentication target person to enter a predetermined area, for example. In this case, the camera 1 may be disposed at an entrance of the predetermined area where the authentication target person can use when entering the predetermined area, for example. Furthermore, the registrant may be a person who is authorized to enter the predetermined area. For example, when determining that the authentication of the authentication target person is successful, the information processing system SYSa may determine that the authentication target person is allowed to enter the predetermined area. In this case, the information processing system SYSa may set a state of a gate apparatus disposed at the entrance of the predetermined area, into an open state in which the entry of the authentication target person to the predetermined area is not blocked. On the other hand, for example, when determining that the authentication of the authentication target person is failed, the information processing system SYSa may determine that the authentication target person is not allowed to enter the predetermined area. In this case, the information processing system SYSa may set the state of the gate apparatus disposed at the entrance of the predetermined area, into a closed state in which the entry of the authentication target person to the predetermined area is prohibited. The authentication operation of the information processing system SYSa, however, is not limited into the situation in which it is determined whether or not to allow the authentication target person to enter the predetermined area.

(1-2-2) Configuration of Information Processing Apparatus 2

Figure 2:
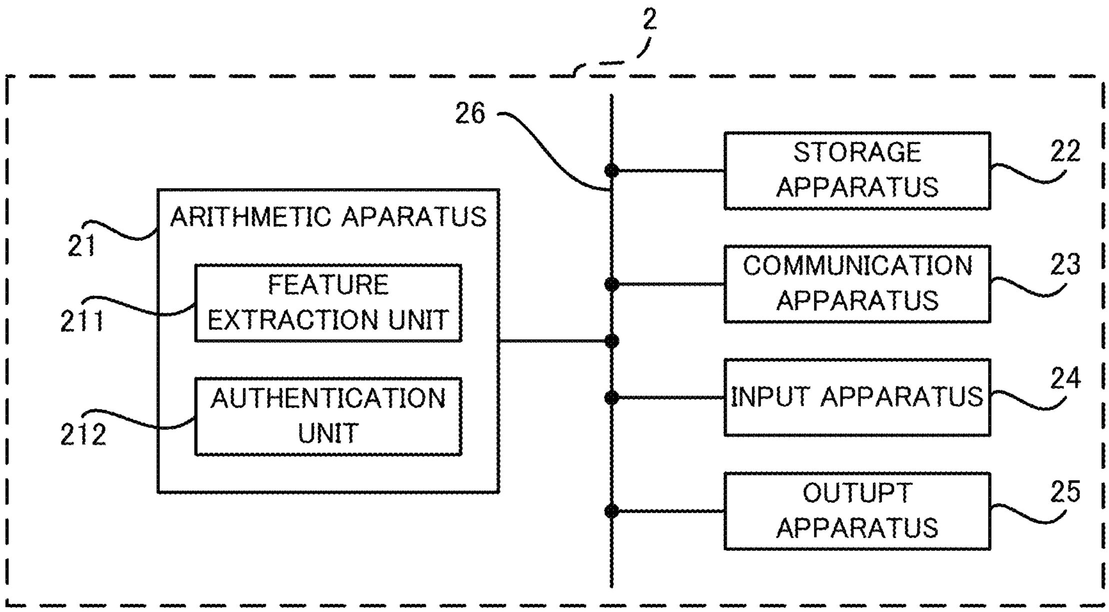
FIG. 2 is a block diagram illustrating a configuration of an information processing apparatus according to the first example embodiment.

Subsequently, with reference to FIG. 2, a configuration of the information processing apparatus 2 in the first example embodiment will be described. FIG. 2 is a block diagram illustrating the configuration of the information processing apparatus 2 according to the first example embodiment.

As illustrated in FIG. 2, the information processing apparatus 2 includes an arithmetic apparatus 21, a storage apparatus 22, and a communication apparatus 23. Furthermore, the information processing apparatus 2 may include an input apparatus 24 and an output apparatus 25. The information processing apparatus 2, however, may not include at least one of the input apparatus 24 and the output apparatus 25. The arithmetic apparatus 21, the storage apparatus 22, the communication apparatus 23, the input apparatus 24, and the output apparatus 25 may be connected through a data bus 26.

The arithmetic apparatus 21 includes, for example, at least one of a CPU, a GPU (Graphics Processing Unit) and a FPGA (Field Programmable Gate Array). The arithmetic apparatus 21 reads a computer program. For example, the arithmetic apparatus 21 may read a computer program stored in the storage apparatus 22. For example, the arithmetic apparatus 21 may read a computer program stored in a computer-readable, non-transitory recording medium, by using a not-illustrating recording medium reading apparatus. The arithmetic apparatus 21 may obtain (i.e., download or read) a computer program from a not-illustrated apparatus disposed outside the information processing apparatus 2, through the communication apparatus 23 (or another communication apparatus). The arithmetic apparatus 21 executes the read computer program. Consequently, a logical functional block for performing a process to be performed by the information processing apparatus 2 (e.g., the above-mentioned authentication process, and especially the authentication process including the continuity determination process) is implemented in the arithmetic apparatus 21. That is, the arithmetic apparatus 21 is allowed to function as a controller for implementing the logical function block for performing the process to be performed by the information processing apparatus 2.

FIG. 2 illustrates an example of the logical functional block implemented in the arithmetic apparatus 21. As illustrated in FIG. 2, a feature extraction unit 211 that is a specific example of a "extraction unit" and an authentication unit 212 that is a specific example of an "authentication unit" are implemented in the arithmetic apparatus 21. The feature extraction unit 211 extracts a feature quantity of the imaged person, from each of the plurality of person images IMG. In particular, the feature extraction unit 211 extracts the feature quantity that can be used to determine whether or not there is a continuity in the movement of the imaged person. The authentication unit 212 determines whether or not there is a continuity in the movement of the imaged person among the plurality of person images IMG. The authentication unit 212 determines that the authentication of the imaged person (i.e., the authentication of the imaged person) is failed, when determining that there is no continuity in the movement of the imaged person among the plurality of person images IMG, on the basis of the feature quantity.

The storage apparatus 22 is configured to store desired data. For example, the storage apparatus 22 may temporarily store a computer program to be executed by the arithmetic apparatus 21. The storage apparatus 22 may temporarily store the data that are temporarily used by the arithmetic apparatus 21 when the arithmetic apparatus 21 executes the computer program. The storage apparatus 22 may store the data that are stored by the information processing apparatus 2 for a long time. The storage apparatus 22 may include at least one of a RAM (Random Access Memory), a ROM (Read Only Memory), a hard disk apparatus, a magneto-optical disk apparatus, and a SSD (Solid State Drive). That is, the storage apparatus 22 may include a non-transitory recording medium.

The communication apparatus 23 is configured to communicate with the camera 1 through the communication network 3 (see FIG. 1). In the first example embodiment, the communication apparatus 23 receives (i.e., obtains) the person images IMG from the camera 1 through the communication network 3.

The input apparatus 24 is an apparatus that receives an input of information to the information processing apparatus 2, from outside the information processing apparatus 2. For example, the input apparatus 24 may include an operating apparatus (e.g., at least one of a keyboard, a mouse, and a touch panel) that is operable by an operator of the information processing apparatus 2. For example, the input apparatus 24 may include a reading apparatus that is configured to read information recorded as data in a recording medium that is externally attachable to the information processing apparatus 2.

The output apparatus 25 is an apparatus that outputs information to the outside of the information processing apparatus 2. For example, the output apparatus 25 may output the information as an image. That is, the output apparatus 25 may include a display apparatus (a so-called display) that is configured to display an image indicating desired information to be outputted. For example, the output apparatus 25 may output information as audio. That is, the output apparatus 25 may include an audio apparatus (a so-called speaker) that is configured to output audio. For example, the output apparatus 25 may output information to a paper surface. That is, the output apparatus 25 may include a print apparatus (a so-called printer) that is configured to print desired information on the paper surface.

(1-3) Authentication Operation Performed by Information Processing System SYSa

Figure 3:
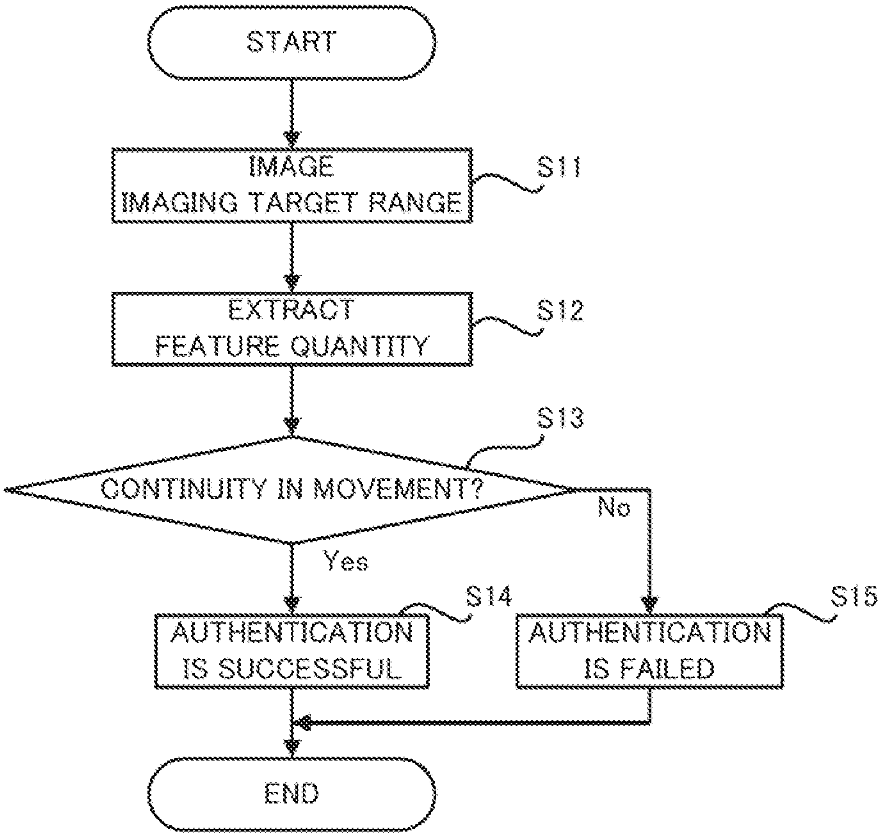
FIG. 3 is a flowchart illustrating a flow of an authentication operation performed by the information processing system according to the first example embodiment.

Next, with reference to FIG. 3, the authentication operation performed by the entry management system SYSa will be described. FIG. 3 is a flowchart illustrating the flow of the authentication operation performed by the entry management system SYSa.

As illustrated in FIG. 3, The camera 1 images the imaging target range continuously in time series (step S11). That is, the camera 1 performs the imaging process (step S11). Consequently, the camera 1 generates a plurality of person images IMG. As described above, when the authentication target person who is actually in front of the camera 1, is in the imaging target range, the authentication target person who is actually in front of the camera 1 appears as the imaged person in each of the plurality of person images IMG. On the other hand, when the display that displays an image of a registrant that is different from the authentication target person who is actually in front of the camera 1, is in the imaging target range, the registrant displayed on the display appears as the imaged person in each of the plurality of person images IMG. The camera 1 transmits the generated person images IMG to the information processing apparatus 2.

Following or in parallel with the imaging process performed by the camera 1, the information processing apparatus 2 performs the authentication process (step S12 to step S15). For convenience of description, FIG. 3 exemplifies that the information processing apparatus 2 performs the authentication process after the imaging process performed by the camera 1. The information processing apparatus 2, however, may perform the authentication process in parallel with the imaging process performed by the camera 1.

In order to perform the authentication process, the feature extraction unit 211 extracts, from each of the plurality of person images IMG generated in the step S11, the feature quantity of the imaged person who appears in the person images IMG (step S12). In particular, as described above, the feature extraction unit 211 extracts the feature quantity that can be used to determine whether or not there is a continuity in the movement of the imaged person. In the first example embodiment, the feature quantity that can be used to determine whether or not there is a continuity in the movement of the imaged person is typically the feature quantity of the imaged person that changes in accordance with the movement of the imaged person.

When the imaged person moves, a certain part of a body of the imaged person possibly moves. For this reason, the feature extraction unit 211 may extract a feature quantity related to a position of the certain part of the body of the imaged person (i.e., a certain feature point of the body of the imaged person) in the step S12. For example, at least one of the followings may be extracted: a feature quantity related to the position of at least a part of a head of the imaged person, a feature quantity related to the position of at least a part of a face of the imaged person, a feature quantity related to the position of at least a part of a hand of the imaged person, a feature quantity related to the position of at least a part of a trunk of the imaged person, a feature quantity related to the position of at least a part of a leg of the imaged person, a feature quantity related to the position of at least a part of an eyebrow of the imaged person, a feature quantity related to the position of at least a part of eyelashes of the imaged person, a feature quantity related to the position of at least a part of an eye of the imaged person, a feature quantity related to the position of at least a part of an eyeball of the imaged person, and a feature quantity related to the position of at least a part of a mouth of the imaged person.

The feature quantity extracted in the step S12 is used to determine whether or not there is a continuity in the movement of the imaged person. For this reason, the step S12 may be a part of the continuity determination process. That is, the feature extraction unit 211 may perform the step S12 as a part of the continuity determination process.

Then, the authentication unit 212 determines whether or not there is a continuity in the movement of the imaged person among the plurality of person images IMG on the basis of the feature quantity extracted in the step S12 (step S13). That is, the feature extraction unit 211 performs the step S13 as a part of the continuity determination process.

In the first example embodiment, in order to determine whether or not there is a continuity in the movement of the imaged person, authentication unit 212 determines whether or not the feature quantity extracted in the step S12 changes continuously in time series among the plurality of person images IMG, for example. When determining that the feature quantity changes continuously in time series among the plurality of person images IMG, the authentication unit 212 determines that there is a continuity in the movement of the imaged person. On the other hand, when determining that the feature quantity does not change continuously in time series among the plurality of person images IMG, the authentication unit 212 determines that there is no continuity in the movement of the imaged person. In other words, when determining that the feature quantity changes discontinuously in time series among the plurality of person images IMG, the authentication unit 212 determines that there is no continuity in the movement of the imaged person.

As a result of the determination in the step S13, when determining that there is a continuity in the movement of the imaged person (step S13: Yes), the authentication unit 212 determines that there is no possibility that the authentication target person pretends to be a person who is different from the authentication target person. That is, the authentication unit 212 determines that the authentication target person who is actually in front of the camera 1 appears as the imaged person in the person images IMG. In this case, the authentication unit 212 determines that authentication of the authentication target person is successful (step S14).

The authentication unit 212, however, may determine that the authentication of the authentication target person is successful, not only when a condition that there is a continuity in the movement of the imaged person is satisfied, but also when a condition that the imaged person matches the registrant is satisfied. Therefore, in the first example embodiment, the authentication unit 212 may perform the collation/verification process of determining whether or not the imaged person matches the registrant, in addition to the continuity determination process. Information about the registrant (e.g., a database) may be stored by the storage apparatus 22, for example. In this case, the authentication unit 212 may perform the collation/verification process by using the database stored in the storage apparatus 22.

On the other hand, as a result of the determination in the step S13, when determining that there is no continuity in the movement of the imaged person (step S13: No), the authentication unit 212 determines that the authentication target person may pretend to be a person (typically, the registrant) who is different from the authentication target person. That is, the authentication unit 212 determines that the person (typically, the registrant) who is different from the authentication target person who is actually in front of the camera 1, appears as the imaged person in the person images IMG. For example, the authentication unit 212 determines that a person (typically, the registrant) displayed on the display that is in front of the camera 1, appears as the imaged person in the person images IMG. In this case, the authentication unit 212 determines that the authentication of the authentication target person is failed (step S15).

In summary, in the first example embodiment, when there is a continuity in the movement of the imaged person among the plurality of person images IMG (i.e., the feature quantity of the imaged person changes continuously in time series), the authentication unit 212 determines that there is no possibility that the authentication target person pretends to be a person who is different from the authentication target person (and consequently, the authentication of the authentication target person is successful). That is, the authentication unit 212 determines that there is no possibility of the spoofing (and consequently, the authentication of the authentication target character is successful). On the other hand, when there is no continuity in the movement of the imaged person among the plurality of person images IMG (i.e., the feature quantity of the imaged person changes discontinuously in time series), the authentication unit 212 determines that that authentication target person possibly pretends to be a person who is different from the authentication target person (and consequently, the authentication of the authentication target person is failed). That is, the authentication unit 212 determines that there is a possibility of the spoofing (and consequently, the authentication of the authentication target person is failed). In this way, the authentication unit 212 is capable of properly determining whether or not the spoofing occurs, by performing the continuity determination process. Hereinafter, a technical reason why it is possible to properly determine whether or not the spoofing occurs by performing the continuity determination process will be described with reference to FIG. 4 to FIG. 8.

Figure 4:
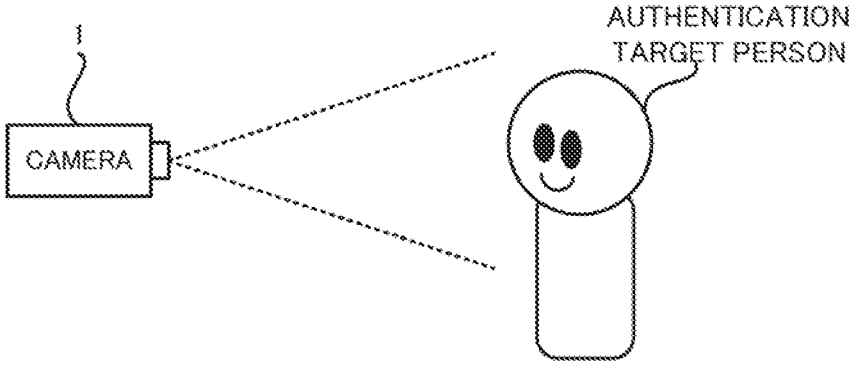
FIG. 4 is a diagram illustrating a camera that images an authentication target person who is actually in front of the camera.
Figure 5:
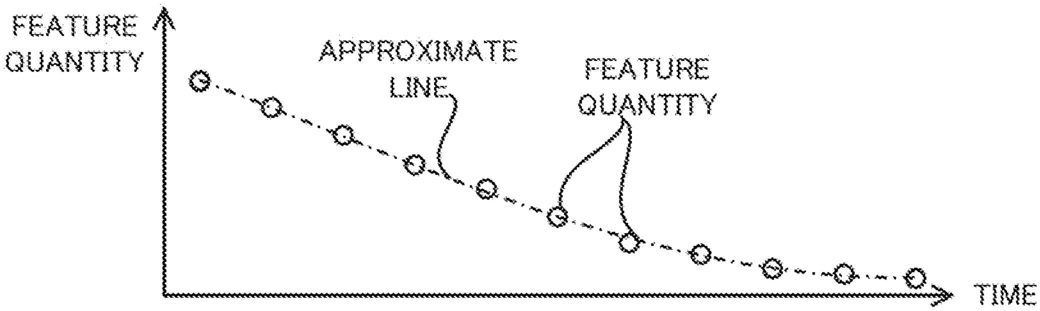
FIG. 5 is a graph illustrating a time change in a feature quantity under a situation where the camera images the authentication target person who is actually in front of the camera.

FIG. 4 illustrates the camera 1 that images the authentication target person who is actually in front of the camera 1. In this case, the camera 1 images the authentication target person continuously in time series at the timing corresponding to the imaging rate of the camera 1. As a consequence, the feature quantity of the imaged person is likely to change in a change aspect corresponding to the movement of the authentication target person. For example, FIG. 5 is a graph illustrating a time change in the feature quantity under a situation where the camera 1 images the authentication target person who is actually in front of the camera 1. As illustrated in FIG. 5, the feature quantity of the imaged person is likely to change to be faithful to the movement of the authentication target person (in other words, to follow the movement of the authentication target person). That is, the feature quantity of the imaged person is likely to change in a smooth change aspect corresponding to the movement of the authentication target person. In particular, it is likely that the feature quantity of the imaged person changes in accordance with the movement of the authentication target person, at a cycle corresponding to the imaging rate. In this case, in the first example embodiment, the authentication unit 212 may determine that the feature quantity of the imaged person changes continuously in time series. Therefore, in the first example embodiment, the state in which "the feature quantity of the imaged person changes continuously in time series" (i.e., the state in which there is a continuity in the movement of the imaged person) may mean the state in which "the feature quantity of the imaged person changes in a change manner corresponding to the movement of the authentication target person".

Figure 6:
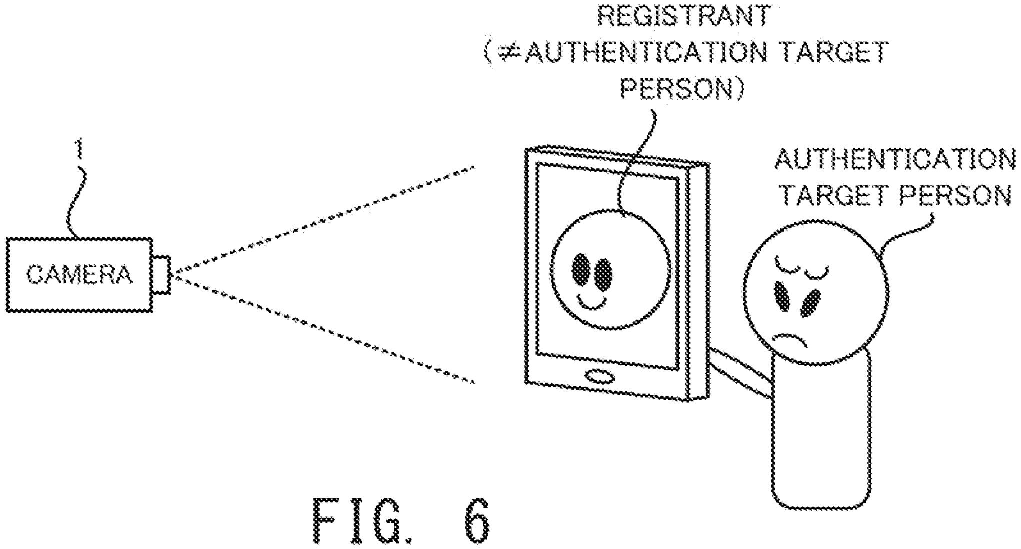
FIG. 6 is a diagram illustrating a camera that images a display on which a registrant who is different from the authentication target person who is actually in front of the camera, is displayed.

On the other hand, FIG. 6 illustrates the camera 1 that images a display that displays the registrant who is different from the authentication target person who is actually in front of the camera 1. In this case, the camera 1 captures the image of the registrant displayed on the display, continuously in time series at the timing corresponding to the imaging rate of the camera 1. Here, the display generally displays the image at a predetermined display rate (in other words, a display rate). The display rate may indicate the number of times that the display displays (in other words, updates or rewrites) the image per unit time. For example, the display may display the image at a display rate of 60 [fps]. A display rate of "x [fps]" (where x is a positive real number) means a display rate at which the image can be displayed x times per second. In this case, depending on a magnitude relation between the imaging rate of the camera 1 and the display rate of the display, the feature quantity of the imaged person is likely to change in a different change aspect from the change aspect corresponding to the movement of the authentication target person. Typically, when the imaging rate of the camera 1 is different from the display rate of the display, the feature quantity of the imaged person is likely to change in a different change aspect from the change aspect corresponding to the movement of the authentication target person.

Figure 7:
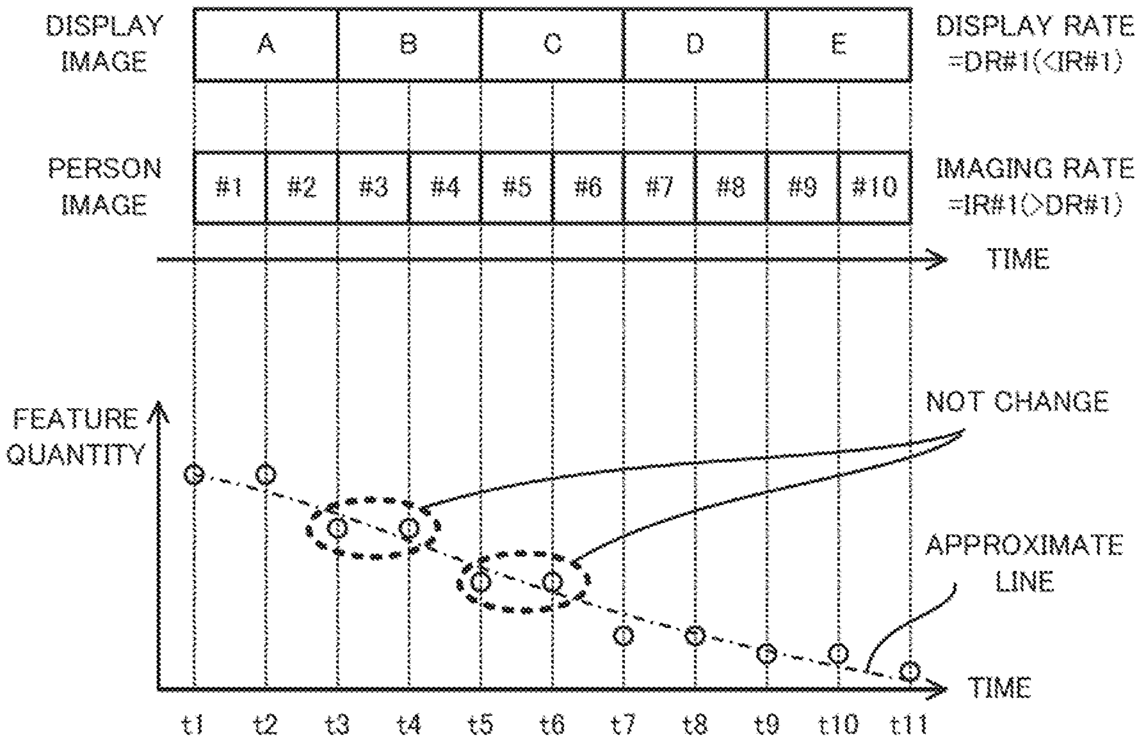
FIG. 7 is a graph illustrating a time change in the feature quantity under a situation where a display rate of the display that displays the registrant is lower than an imaging rate of the camera.

For example, FIG. 7 is a graph illustrating a time change in the feature quantity under a situation where the camera 1 images the display that displays a plurality of images including a registrant who makes a certain movement at a display rate of DR #1 [fps], at an imaging rate of IR #1 [fps] (wherein IR #1>DR #1). That is, FIG. 7 is a graph illustrating the time change in the feature quantity under a situation where the display rate of the display that displays the registrant is lower than the imaging rate of the camera 1. As illustrated in FIG. 7, when the display rate of the display is lower than the imaging rate of the camera 1, the feature quantity of the imaged person is likely to change in a different change aspect from the change aspect corresponding to the movement of the authentication target person. Specifically, as illustrated in FIG. 7, at a time t1, the display displays a display image A including the registrant in a first state. Consequently, at the time t1, the camera 1 captures the display image A displayed on the display, thereby to generate a person image IMG #1 including the registrant in the first state. Then, at a time t2 after a lapse of an imaging cycle IC #1 corresponding to an inverse number of the imaging rate IR #1 from the time t1, the camera 1 images the display again. At the time t2, since it is before a lapse of a display cycle DC #1 corresponding to an inverse number of the display rate DR #1 from the time t1, the display remains displaying the display image A. Consequently, the camera 1 images again the display image A displayed on the display, thereby to generate a person image IMG #2 including the registrant in the first state. Then, at a time t3 after a lapse of the imaging cycle IC #1 from the time t2, the camera 1 images the display again. At the time t3, since it is after a lapse of the display cycle DC #1 from the time t1, the display displays a display image B including the registrant whose state is changed from the first state to a second state in accordance with the movement of the registrant. Consequently, at the time t3, the camera 1 images the display image B displayed on the display, thereby to generate a person image IMG #3 including the registrant in the second state. The same operation is repeated hereinafter. Consequently, at a time t4 after a lapse of the imaging cycle IC #1 from the time t3, the camera 1 images the display image B displayed on the display, thereby to generate a person image IMG #4 including the registrant in the second state. Furthermore, at each of a time t5 after a lapse of the imaging cycle IC #1 from the time t4 and a time t6 after a lapse of the imaging cycle IC #1 from the time t5, the display displays a display image C including the registrant whose state is changed from the second state to a third state in accordance with the movement of the registrant. Consequently, at each of the time t5 and the time t6, the camera 1 images the display image C displayed on the display, thereby to generate respective one of person images IMG #5 and IMG #6 including the registrant in the third state. Furthermore, at each of a time t7 after a lapse of the imaging cycle IC #1 from the time t6 and a time t8 after a lapse of the imaging cycle IC #1 from the time t7, the display displays a display image D including the registrant whose state is changed from the third state to a fourth state in accordance with the movement of the registrant. Consequently, at each of the time t7 and the time t8, the camera 1 images the display image D displayed on the display, thereby to generate respective one of person images IMG #7 and IMG #8 including the registrant in the fourth state. Furthermore, at each of a time t9 after a lapse of the imaging cycle IC #1 from the time t8 and a time t10 after a lapse of the imaging cycle IC #1 from the time t9, the display displays a display image E including the registrant whose state is changed from the fourth state to a fifth state in accordance with the movement of the registrant. Consequently, at each of the time t9 and the time t10, the camera 1 images the display image E displayed on the display, thereby to generate respective one of person images IMG #9 and IMG #10 including the registrant in the fifth state. In this case, as illustrated in FIG. 7, it is likely that the feature quantity of the imaged person does not change faithfully to the movement of the authentication target person (in other words, it changes so as not to follow the movement of the authentication target person). That is, the feature quantity of the imaged person is likely to change in a discontinuous change aspect that does not match the movement of the authentication target person. This is because the camera 1 redundantly images the same display image displayed on the display, at different times.

Figure 8:
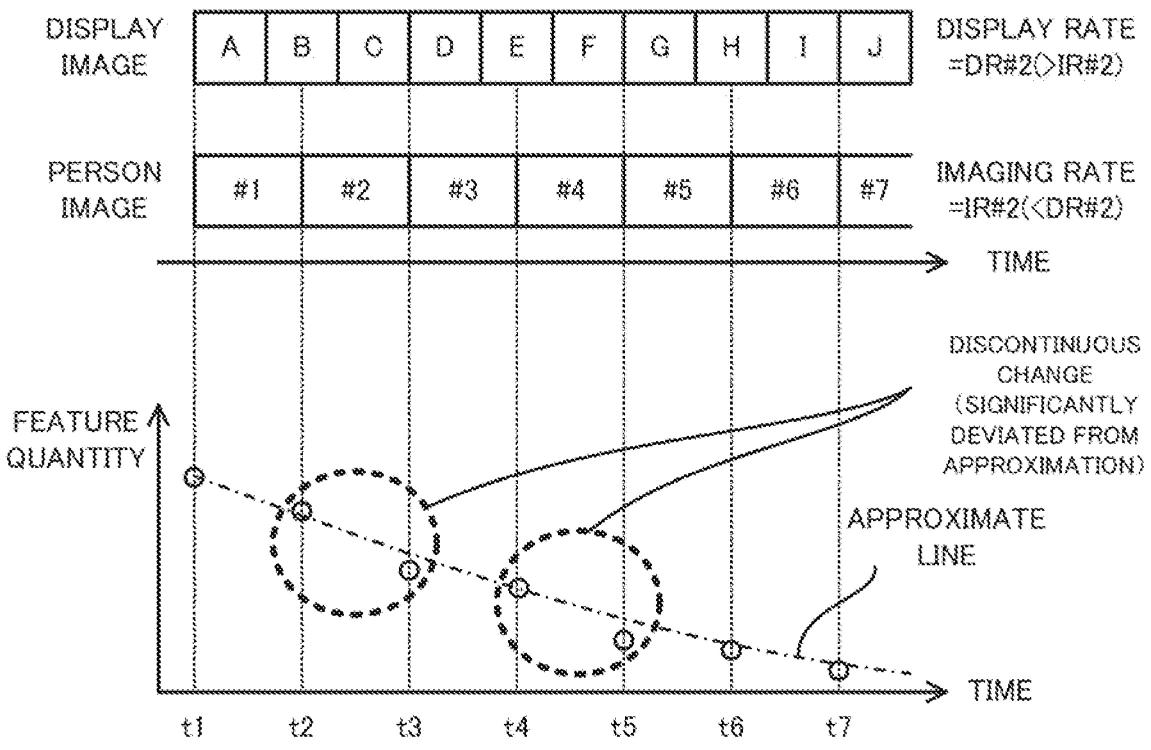
FIG. 8 is a graph illustrating a time change in the feature quantity under a situation where the display rate of the display that displays the registrant is higher than the imaging rate of the camera.

On the other hand, for example, FIG. 8 is a graph illustrating a time change in the feature quantity under a situation where the camera 1 images the display that displays a plurality of images including a registrant who makes a certain movement at a display rate of DR #2 [fps], at an imaging rate of IR #2 [fps] (wherein IR #2<DR #2). That is, FIG. 8 is a graph illustrating the time change in the feature quantity under a situation where the display rate of the display displaying the registrant is higher than the imaging rate of the camera 1. As illustrated in FIG. 8, when the display rate of the display is higher than the imaging rate of the camera 1, the feature quantity of the imaged person is likely to change in a different change aspect from the change aspect corresponding to the movement of the authentication target person. Specifically, as illustrated in FIG. 8, at a time t1, the display displays a display image A including the registrant in a first state. Consequently, at the time t1, the camera 1 images the display image A displayed on the display, thereby to generate a person image IMG #1 including the registrant in the first state. Then, at a time t2 after a lapse of an imaging cycle IC #2 corresponding to an inverse number of the imaging rate IR #2 from the time t1, the camera 1 images the display again. At the time t2, since it is after a lapse of a display cycle DC #2 corresponding to an inverse number of the display rate DR #2 from the time t1, the display displays the display image B including the registrant whose state is changed from the first state to a second state in accordance with the movement of the registrant. Consequently, at the time t2, the camera 1 images the display image B displayed on the display, thereby to generate a person image IMG #2 including the registrant in the second state. Then, at a time t3 after a lapse of the imaging cycle IC #2 from the time t2, the camera 1 images the display again. Here, at the time t3, it is after a lapse of a period corresponding to three times the display cycle DC #2 from the time t1. As a consequence, the display already ends the display of the display image C including the registrant whose state is changed from the second state to the third state in accordance with the movement of the registrant, and displays a display image D including the registrant whose state is changed from the third state to a fourth state in accordance with the movement of the registrant. Consequently, at the time t3, the camera 1 does not image the display image C including the registrant in the third state, but images the display image D displayed on the display, thereby to generate a person image IMG #3 including the registrant in the fourth state. That is, the person images IMG #1 to IMG #3 include not the registrant who makes a natural movement so as to transition from the first state to the fourth state through the second and third states, but the registrant who makes an unnatural movement (i.e., a discontinuous movement) so as to transition from the first state to the fourth state through the second state, but without through the third state. The same operation is repeated hereinafter. Consequently, at a time t4 after a lapse of the imaging cycle IC #2 from the time t3, the display displays a display image E including the registrant whose state is changed from the fourth state to a fifth state in accordance with the movement of the registrant. Consequently, at the time t4, the camera 1 images the display image E displayed on the display, thereby to generate a person image IMG #4 including the registrant in the fifth state. Furthermore, at a time t5 after a lapse of the imaging cycle IC #2 from the time t4, the display displays a display image G including the registrant whose state is changed from the fifth state through a sixth state to a seventh state in accordance with the movement of the registrant. Consequently, at the time t5, the camera 1 images the display image G displayed on the display, thereby to generate a person image IMG #5 including the registrant in the seventh state. Furthermore, at a time t6 after a lapse of the imaging cycle IC #2 from the time t5, the display displays a display image H including the registrant whose state is changed from the seventh state to an eighth state in accordance with the movement of the registrant. Consequently, at the time t6, the camera 1 images the display image H displayed on the display, thereby to generate a person image IMG #6 including the registrant in the eighth state. Furthermore, at a time t7 after a lapse of the imaging cycle IC #2 from the time t6, the display displays a display image J including the registrant whose state is changed from the eighth state through a ninth state to a tenth state in accordance with the movement of the registrant. Consequently, at the time t7, the camera 1 images the display image J displayed on the display, thereby to generate a person image IMG #7 including the registrant in the tenth state. In this case, as illustrated in FIG. 8, it is likely that the feature quantity of the imaged person does not change faithfully to the movement of the authentication target person (in other words, it changes so as not to follow the movement of the authentication target person). That is, the feature quantity of the imaged person is likely to change in a discontinuous change aspect that does not match the movement of the authentication target person. This is because the person images IMG #1 to IMG #7 include not the registrant who makes a natural movement so as to transition from the first state to the tenth state through the second, third, fourth, fifth, sixth, seventh, eighth, and ninth states in order, but the registrant who makes an unnatural movement (i.e., a discontinuous movement) so as to transition from the first state to the tenth state without through the third, sixth, and ninth states.

As described above, even when the display displays a plurality of images including a registrant who makes a certain movement, the feature quantity of the imaged person is likely to change discontinuously in time series. That is, even if the registrant displayed on the display makes the same movement as that of the authentication target person who is actually in front of the camera 1, the feature quantity of the imaged person who appears in the person images IMG generated by imaging the registrant displayed on the display, is likely to change discontinuously in time series. In other words, even if the registrant displayed on the display makes the same movement as that of the authentication target person who is actually in front of the camera 1, it is likely that the feature quantity of the imaged person who appears in the person images IMG generated by imaging the registrant displayed on the display, changes in a different change aspect from that of the feature quantity of the imaged person who appears in the person images IMG generated by imaging the authentication target person. In this case, in the first example embodiment, authentication unit 212 determines that the feature quantity of the imaged person changes discontinuously in time series. Therefore, in the first example embodiment, the state in which "the feature quantity of the imaged person changes discontinuously in time series" (i.e., the state in which there is no continuity in the movement of the imaged person) may mean the state in which "the feature quantity of the imaged person changes in a different change aspect from the change aspect corresponding to the movement of the authentication target person".

In the example illustrated in FIG. 7, the feature quantity of the imaged person changes at certain timing (e.g., at the times t3, t5, t7 and t9), but does not change at certain timing (e.g., at the times t2, t4, t6, t8 and t10). That is, in the example illustrated in FIG. 7, the feature quantity of the imaged person changes in a change aspect in which the feature quantity that does not change from the feature quantity obtained before and after, appears at a constant cycle. For this reason, the state in which "the feature quantity of the imaged person changes in a different change aspect from the change aspect corresponding to the movement of the authentication target person" may include the state in which "the feature quantity that does not change from the feature quantity obtained before and after, appears at a constant cycle", as illustrated in FIG. 7, for example. In this case, the authentication unit 212 may determine whether or not there is a continuity in the movement of the imaged person, by determining whether or not the feature quantity that does not change from the feature quantity obtained before and after, appears at a constant cycle. For example, when determining that the feature quantity that does not change from the feature quantity obtained before and after, appears at a constant cycle, the authentication unit 212 may determine that there is no continuity in the movement of the imaged person. For example, when determining that the feature quantity that does not change from the feature quantity obtained before and after, does not appear at a constant cycle, the authentication unit 212 may determine that there is a continuity in the movement of the imaged person.

In the example illustrated in FIG. 8, it can be also said that the feature quantity of the imaged person changes in a change aspect in which a deviation amount (i.e., a difference) from an approximate line connecting the feature quantities (i.e., a regression curve) increases at certain timing. That is, in the example illustrated in FIG. 8, the feature quantity of the imaged person changes in a change aspect in which the difference between the feature quantity and the approximate line increases by a certain amount or more at a certain cycle. For this reason, the state in which "the feature quantity of the imaged person changes in a different change aspect from the change aspect corresponding to the movement of the authentication target person" may include the state in which the difference between the feature quantity and the approximation line increases by a predetermined threshold or more at a certain cycle (i.e., a phenomenon in which the difference between the feature quantity and the approximation line increases by a predetermined threshold or more, is observed at a certain cycle), as illustrated in FIG. 8, for example. In this case, the authentication unit 212 may determine whether or not there is a continuity in the movement of the imaged person, on the basis of the difference between the feature quantity and the approximate line connecting the feature quantities. For example, when determining that the difference between the feature quantity and the approximate line increases by the predetermined threshold or more at a constant cycle, the authentication unit 212 may determine that there is a continuity in the movement of the imaged person. For example, when determining that the difference between the feature quantity and the approximate line does not increase by the predetermined threshold or more at a constant cycle, the authentication unit 212 may determine that there is a(no?) continuity in the movement of the imaged person.

(1-4) Technical Effect of Information Processing System SYSa

As described above, the information processing system SYSa in the first example embodiment focuses on the fact that there is a significant difference between the continuity in the movement of the imaged person under a situation where the spoofing does not occur and the continuity in the movement of the imaged person under a situation where the spoofing occurs, and determines whether or not the spoofing occurs on the basis of the continuity in the movement of the imaged person. For this reason, the information processing system SYSa (especially, the information processing apparatus 2 that actually performs the authentication process) is capable of determining whether or not the spoofing occurs, with higher accuracy, in comparison with an information processing apparatus in a comparative example that determines whether or not the spoofing occurs, without focusing on the continuity in movement of the imaged person. Consequently, the information processing system SYSa is capable of preventing the spoofing more properly. That is, the information processing system SYSa (especially, the information processing apparatus 2 that actually performs the authentication process) is capable of authenticating the authentication target person with high accuracy by preventing the spoofing more properly.

Since the authentication unit 212 determines whether or not there is a continuity in the movement of the imaged person in order to determine whether or not the spoofing occurs, it is preferable that the authentication target person moves in front of the camera 1. For this reason, the arithmetic apparatus 21 may use the output apparatus 25 to instruct the authentication target person to move in front of the camera 1. For example, the arithmetic apparatus 21 may use the output apparatus 25 to instruct the authentication target person to make a particular movement in front of the camera 1. An example of the particular movement is a continuous movement of the authentication target person. The continuous movement of the authentication target person includes at least one of the following movements: the authentication target person walking, the authentication target person running, the authentication target person jumping, and the authentication target person squatting down. An example of the particular movement is a continuous movement of a certain part of the body of the authentication target person. An example of the continuous movement of the certain part of the body of the authentication target person includes at least one of the following movements: raising a hand, lowering a hand, swinging a hand, raising a leg, lowering a leg, swinging a leg, titling a face, swinging a neck (i.e., swinging a face), lifting an eyebrow, opening an eye, closing an eye, opening a mouth, and closing a mouth.

Alternatively, the camera 1 may image the authentication target person who moves toward the camera 1. For example, when the camera 1 is disposed at the entrance of a predetermined area, the authentication target person may walk toward the camera 1 (i.e., toward the entrance) to enter the predetermined area. In this case, if the camera 1 images the authentication target person who moves toward the camera 1, the feature extraction unit 211 is capable of extracting the feature quantity that changes in accordance with the movement of the authentication target person who moves toward the camera 1, from a plurality of person images IMG generated by the camera 1. Consequently, the authentication unit 212 is capable of determining whether or not the spoofing occurs, on the basis of the continuity in the movement of the authentication target person who moves toward the camera 1. In this case, since the authentication target person does not need to make a particular movement positively or intentionally, it is possible to enjoy an effect of reducing labor and time of the authentication target person.

(2) Information Processing System SYS in Second Example Embodiment

Figure 9:
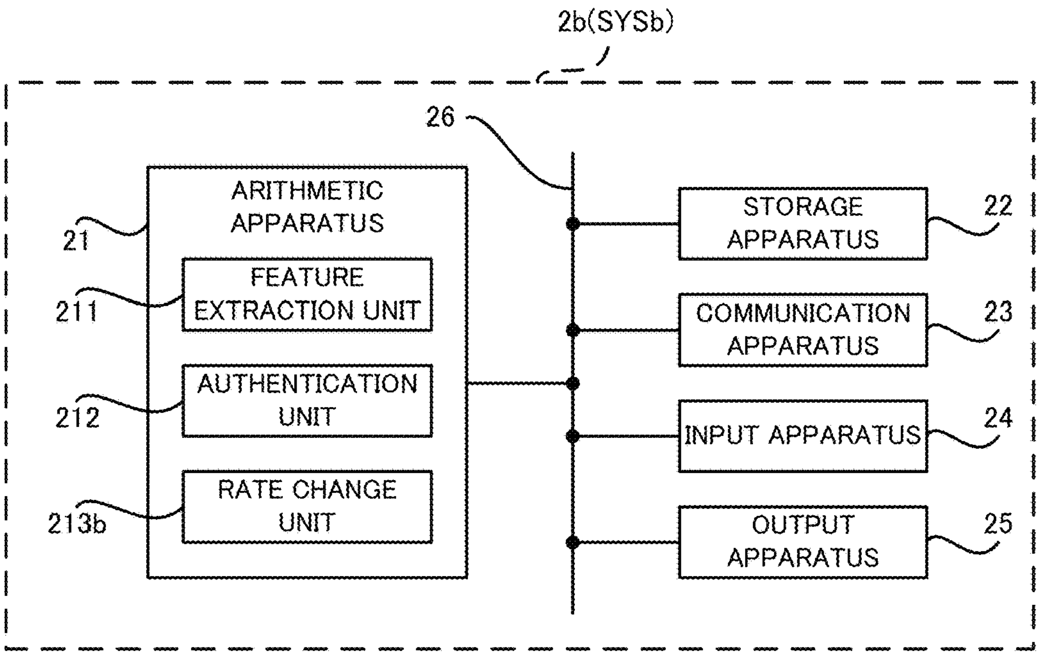
FIG. 9 is a block diagram illustrating a configuration of an information processing apparatus according to a second example embodiment.

Next, the information processing system SYS in a second example embodiment will be described. In the following explanation, the information processing system SYS in the second example embodiment is referred to as an "information processing system SYSb." The information processing system SYSb in the second example embodiment is different from the information processing system SYSa in the first example embodiment in that an information processing apparatus 2*b* is provided instead of the information processing apparatus 2. Other features of the information processing system SYSb may be the same as those of the information processing system SYSa. Therefore, the information processing apparatus 2*b* in the second example embodiment will be described below with reference to FIG. 9. FIG. 9 is a block diagram illustrating a configuration of the information processing apparatus 2*b* according to the second example embodiment.

As illustrated in FIG. 9, the information processing apparatus 2*b* in the second example embodiment is different from the information processing apparatus 2 in the first example embodiment in that a rate change unit 213*b* is implemented as a logical functional block in the arithmetic apparatus 21. The rate change unit 213*b* is a specific example embodiment of a "change unit". Other features of the information processing apparatus 2*b* may be the same as those of the information processing apparatus 2.

The rate change unit 213*b* is configured to change the imaging rate of the camera 1. For example, the rate change unit 213*b* may select one of a plurality of rate candidates that can be set as the imaging rate of the camera 1, and may change the imaging rate of the camera 1 to the selected rate candidate. In this case, the rate change unit 213*b* may randomly select one of the plurality of rate candidates. Alternatively, the rate change unit 213*b* may select one of the plurality of rate candidates in accordance with a predetermined selection criterion. For example, the rate change unit 213*b* may change the imaging rate of the camera 1 such that the imaging rate after the change is higher than the imaging rate before the change. For example, the rate change unit 213*b* may change the imaging rate of the camera 1 such that the imaging rate after the change is lower than the imaging rate before the change.

When the imaging rate is changeable as described above, compared to when the imaging rate is not changeable (i.e., when the imaging rate is fixed), the information processing apparatus 2*b* is capable of determining whether or not the spooking occurs more properly. The reason is as follows.

First, in order to determine whether or not there is the spoofing using the display that displays the image of the registrant, the information processing apparatus 2*b* uses the fact that there is no continuity in the movement of the imaged person when the camera 1 images the display that displays the image of the registrant who makes a certain movement, as described above. On the other hand, when the display rate of the display matches the imaging rate of the camera 1, the continuity in the movement of the imaged person may be maintained even if the camera 1 images the display that displays the image of the registrant who makes a certain movement. This is because the timing of the camera 1 capturing the image of the registrant displayed on the display is synchronized with the timing of the display displaying again the image of the registrant. Consequently, the information processing apparatus 2*b* may erroneously determine that the spoofing does not occur even under the occurrence of the spoofing. That is, the information processing apparatus 2*b* may erroneously determine that the authentication of the authentication target person is successful under a situation where the authentication target person pretends to be the registrant by using the display that displays the image of the registrant.

When the imaging rate of the camera 1 is changed, however, compared to when the imaging rate of the camera 1 is not changed, it is likely that the display rate of the display does not match the imaging rate of the camera 1. Consequently, it is likely that the display rate of the display does not match the imaging rate of the camera 1 under a situation where the camera 1 captures the image of the registrant displayed on the display. This is because, usually, the display rate of the display is not changed, and information about the imaging rate of the camera 1 is unknown to the malicious authentication target person who pretends to be the registrant. Therefore, when the camera 1 images the display that displays the image of the registrant who makes a certain movement, it is likely that there is no continuity in the movement of the imaged person. As a consequence, the information processing apparatus 2*b* is capable of properly determining that the spoofing occurs under the occurrence of the spoofing. That is, the information processing apparatus 2*b* is capable of determining whether or not the spoofing occurs with higher accuracy.

As an example, when the imaging rate of the camera 1 is fixed at 60 fps while the display rate of the display is set at 60 fps, the information processing apparatus 2*b* may erroneously determine that the spoofing does not occur under the occurrence of the spoofing. On the other hand, when the imaging rate of the camera 1 is changed from 60 fps to 90 fps, which is higher than 60 fps, under such a circumstance, it is likely that the feature quantity of the imaged person changes discontinuously in time series, as described in FIG. 7. Alternatively, when the imaging rate of the camera 1 is changed from 60 fps to 30 fps, which is lower than 60 fps, under such a circumstance, it is likely that the feature quantity of the imaged person changes discontinuously in time series, as described in FIG. 8. Consequently, it is less likely that the information processing apparatus 2*b* erroneously determine that the spoofing does not occur under the occurrence of the spoofing. That is, the information processing apparatus 2*b* is capable of properly determining that the spoofing occurs under the occurrence of the spoofing.

The rate change unit 213*b* may change the imaging rate of the camera 1 at random timing. In this case, compared to when the rate change unit 213*b* changes the imaging rate of the camera 1 at predetermined timing, it is less likely that the malicious authentication target person notices the change in the imaging rate of the camera 1. This makes it harder for the malicious authentication target person to take measures to match the display rate of the display with the imaging rate of the camera 1. As a consequence, the information processing apparatus 2*b* is allowed to properly determine that the spoofing occurs under the occurrence of the spoofing.

The rate change unit 213*b* may change the imaging rate of the camera 1 during a period in which the same authentication target person is in front of the camera 1. For example, the rate change unit 213*b* may change the imaging rate of the camera 1 from a first imaging rate to a second imaging rate during a period in which the same authentication target person is in the imaging target range of the camera 1. That is, the rate change unit 213*b* may change the imaging rate of the camera 1 from the first imaging rate to the second imaging rate during a period in which the camera 1 images the same authentication target person. In this case, the camera 1 may image the authentication target person at the first imaging rate, and may then image the authentication target person at the second imaging rate. Alternatively, for example, the rate change unit 213*b* may change the imaging rate of the camera 1 from the first imaging rate to the second imaging rate during a period in which the display used by the same malicious authentication target person, is in the imaging target range of the camera 1. That is, the rate change unit 213*b* may change the imaging rate of the camera 1 from the first imaging rate to the second imaging rate during a period in which the camera 1 images the same display (i.e., the image of the same registrant displayed on the same display). In this case, the camera 1 may image the registrant displayed on the display at the first imaging rate, and may then image the same registrant displayed on the display at the second imaging rate.

In this case, the authentication unit 212 may determine that the spoofing occurs (and consequently, the authentication of the authentication target person is failed) when a first condition is satisfied, wherein the first condition is that there is no continuity in the movement of the imaged person among a plurality of person images IMG generated by imaging the imaging target range at the first imaging rate. Alternatively, the authentication unit 212 may determine that the spoofing occurs (and consequently, the authentication of the authentication target person is failed) when a second condition is satisfied, wherein the second condition is that there is no continuity in the movement of the imaged person among a plurality of person images IMG generated by imaging the imaging target range at the second imaging rate in addition to or in place of the first condition. That is, when at least one of the first and second conditions is satisfied, the authentication unit 212 may determine that the spoofing occurs (and consequently, the authentication of the authentication target person is failed). As a consequence, even when the imaging rate of the camera 1 is changed, the authentication unit 212 is allowed to properly determine whether or not the spoofing occurs.

As described above, the information processing system SYSb (especially, the information processing apparatus 2*b*) in the second example embodiment is capable of determining whether or not the spoofing occurs more properly (e.g., with higher accuracy), while enjoying the same effect as the effect that can be enjoyed by the information processing system SYSa (especially, the information processing apparatus 2) in the first example embodiment.

(3) Information Processing System SYS in Third Example Embodiment

Figure 10:
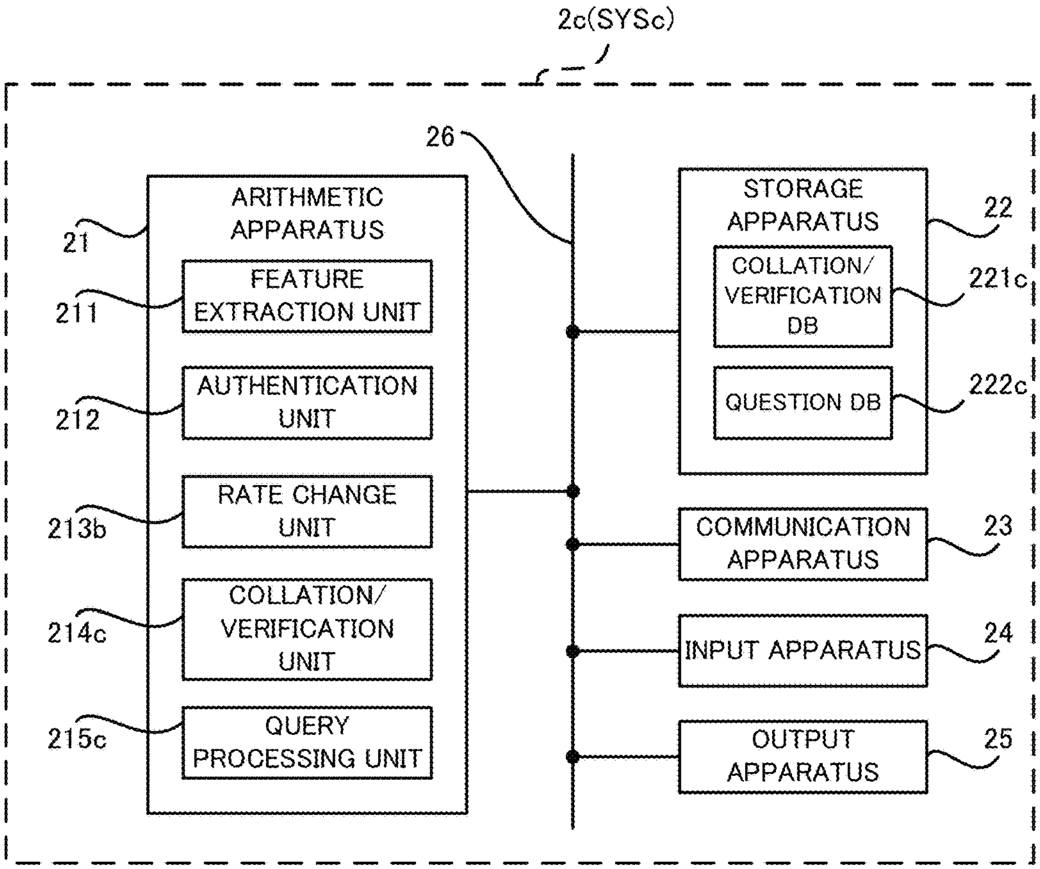
FIG. 10 is a block diagram illustrating a configuration of an information processing apparatus according to a third example embodiment.

Next, the information processing system SYS according to a third example embodiment will be described. In the following explanation, the information processing system SYS in the third example embodiment is referred to as an "information processing system SYSc." The information processing system SYSc in the third example embodiment is different from the information processing system SYSa in the first example embodiment or the information processing system SYS2*b* in the second example embodiment, in that an information processing apparatus 2*c* is provided instead of the information processing apparatus 2. Other features of the information processing system SYSc may be the same as those of the information processing system SYSa or the information processing system SYS2*b*. Therefore, the information processing apparatus 2*c* in the third example embodiment will be described below with reference to FIG. 10. FIG. 10 is a block diagram illustrating a configuration of the information processing apparatus 2*c* according to the third example embodiment.

As illustrated in FIG. 10, the information processing apparatus 2*c* in the third example embodiment is different from the information processing apparatus 2 in the first example embodiment described above or the information processing apparatus 2*b* in the second example embodiment, in that a collation/verification unit 214*c* and a query processing unit 215*c* are implemented as logical functional blocks in the arithmetic apparatus 21. In FIG. 10, the information processing apparatus 2*c* includes the rate change unit 213*b* as in the information processing apparatus 2*b*, but the information processing apparatus 2*c* may not include the rate change unit 213*b* unlike the information processing apparatus 2. Furthermore, the information processing apparatus 2*c* in the third example embodiment is different from the information processing apparatus 2 in the first example embodiment in that the storage apparatus 22 stores a collation/verification DB 221*c* and a query DB 222*c*. Other features of the information processing apparatus 2*c* may be the same as those of the information processing apparatus 2.

Figure 11:
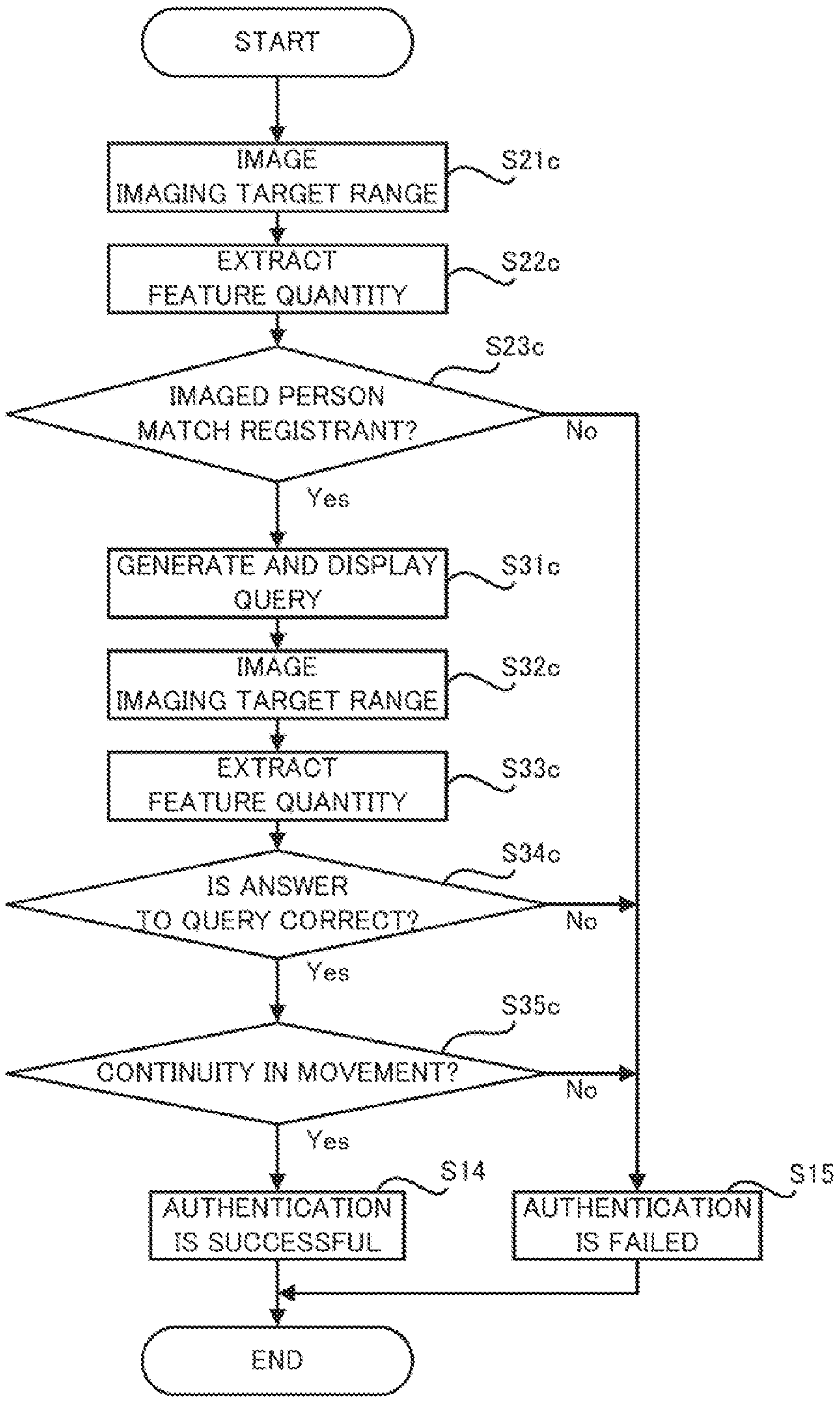
FIG. 11 is a flowchart illustrating a flow of an authentication operation performed by the information processing system according to the third example embodiment.

Next, an authentication operation performed by the information processing system SYSc according to the third example embodiment will be described with reference to FIG. 11. FIG. 11 is a flowchart illustrating a flow of the authentication operation performed by the information processing system SYSc in the third example embodiment.

As illustrated in FIG. 11, the camera 1 images the imaging target range continuously in time series (step S21*c*). That is, the camera 1 performs the imaging process (step S21*c*). The step S21*c* in FIG. 11 may be the same as the step S11 in FIG. 3. Therefore, a detailed description of the step S21*c* in FIG. 11 will be omitted.

Following or in parallel with the imaging process performed by the camera 1 in the step S21*c*, the information processing apparatus 2*c* performs the collation/verification process (step S22*c* to step S23*c*). For convenience of explanation, FIG. 11 exemplifies that the information processing apparatus 2*c* performs the collation/verification process after the imaging process performed by the camera 1. The information processing apparatus 2*c*, however, may perform the collation/verification process in parallel with the imaging process performed by the camera 1.

In order to perform the collation/verification process, the feature extraction unit 211 extracts, from at least one of a plurality of person images IMG generated in the step S11, the feature quantity of the imaged person who appears in the person image IMG (step S22*c*). The feature quantity extracted in the step S22*c* is used to determine whether or not the imaging person matches the registrant. For this reason, the step S22*c* may be a part of the collation/verification process. That is, the feature extraction unit 211 may perform the step S12 as a part of the collation/verification process.

Then, the collation/verification unit 214*c* determines whether or not the imaging person matches the registrant on the basis of the feature quantity extracted in the step S22*c* (step S23*c*). That is, the collation/verification unit 214*c* performs the step S23*c* as a part of the collation/verification process.

The collation/verification unit 214*c* may compare the feature quantity of the imaged person extracted in the step S22*c* with the feature quantity of the registrant, thereby to determine whether or not the imaged person matches the registrant. When a difference between the feature quantity of the imaging person and the feature quantity of the registrant is less than a threshold, the collation/verification unit 214*c* may determine that the imaged person matches the registrant. On the other hand, when the difference between the feature quantity of the imaging person and the feature quantity of the registrant is greater than the threshold, the collation/verification unit 214*c* may determine that the imaged person does not match the registrant.

The collation/verification unit 214*c* may compare the feature quantity of a face of the imaged person with the feature quantity of a face of the registrant, thereby to determine whether or not the imaged person matches the registrant. In this case, the feature extraction unit 211 may extract the feature quantity of the face of the imaged person in the step S22*c*. The collation/verification process of comparing the feature quantity of the face of the imaged person with the feature quantity of the face of the registrant, thereby to determine whether or not the imaged person matches the registrant, may be substantially the same as a collation/verification process performed by face authentication.

The collation/verification unit 214*c* may compare the feature quantity of an iris of the imaged person with the feature quantity of an iris of the registrant, thereby to determine whether or not the imaged person matches the registrant. In this case, the feature extraction unit 211 may extract the feature quantity of the iris of the imaging person in the step S22*c*. The collation/verification process of comparing the feature quantity of the iris of the imaged person with the feature quantity of the iris of the registrant, thereby to determine whether or not the imaged person matches the registrant, may be substantially the same as a collation/verification process performed by iris authentication.

The collation/verification unit 214*c* may compare the feature quantity of a fingerprint of the imaged person with the feature quantity of a fingerprint of the registrant, thereby to determine whether or not the imaged person matches the registrant. In this case, the feature extraction unit 211 may extract the feature quantity of the fingerprint of the imaged person in the step S22*c*. The collation/verification process of comparing the feature quantity of the fingerprint of the imaged person with the feature quantity of the fingerprint of the registrant, thereby to determine whether the imaged person matches the registrant, may be substantially the same as a collation/verification process performed by fingerprint authentication.

The collation/verification unit 214*c* may compare the feature quantity related to an arbitrary biometric information (e.g., at least one of a palmprint and a vein pattern) about the imaged person with the feature quantity related to an arbitrary biometric information about the registrant, thereby to determine whether or not the imaged person matches the registrant. In this case, the feature extraction unit 211 may extract the feature quantity related to the biometric information about the imaged person in the step S22*c*. The collation/verification process of comparing the feature quantity related to the biometric information about the imaged person with the feature quantity related to the biometric information about the registrant, thereby to determine whether or not the imaged person matches the imaged person, may be substantially the same as a collation/verification process performed by biometric authentication.

An example of the biometric information includes information about a human voice. It is, however, not easy to extract the feature quantity related to a voice of the imaged person from the person image IMG. For this reason, when the information about a human voice is used as the biometric information, the information processing SYSc may include a detection apparatus (e.g., a microphone) that is configured to detect a voice of the authentication target person. In this case, the feature extraction unit 211 may extract the feature quantity related to the voice of the imaged person. Then, the matching unit 214*c* may compare the feature quantity related to the voice of the imaged person with the feature quantity related to the voice of the registrant, thereby to determine whether or not the imaged person matches the registrant. The collation/verification process of comparing the feature quantity related to the voice of the imaged person with the feature quantity related to the voice of the registrant, thereby to determine whether or not the imaged person matches the registrant, may be substantially the same as a collation/verification process performed by voice authentication.

The information about the registrant may be stored in the collation/verification DB 221*c* stored by the storage apparatus 22. The collation/verification DB 221*c* may store a personal record including information about the feature quantity of the registrant, for example. Generally, a plurality of registrants are registered in the information processing system SYSc. Therefore, the collation/verification DB 221*c* may store a plurality of personal records respectively corresponding to the plurality of registrants. In this case, the process of determining whether or not the imaged person matches the registrant, is equivalent to a process of determining whether or not there is a registrant who matches the imaged person, among the plurality of registrants.

As a result of the determination in the step S23*c*, when it is determined that the imaged person does not match the registrant (step S23*c*: No), the authentication target person who is actually in front of the camera 1, or the person displayed on the display imaged by the camera 1, is not registered as the registrant in the information processing SYSc. In this case, the authentication unit 212 determines that the authentication of the authentication target person is failed (step S15).

On the other hand, as a result of the determination in the step S23*c*, when it is determined that the imaged person matches the registrant (step S23*c*: Yes), the authentication target person who is actually in front of the camera 1, or the person displayed on the display imaged by the camera 1, is registered as the registrant in the information processing SYSc. In the third example embodiment, however, the authentication unit 212 does not determine that the authentication of the authentication target person is successful, only with the satisfaction of such a collation/verification condition that the imaged person matches the registrant. Specifically, the authentication unit 212 determines that the authentication of the authentication target person is successful, with the satisfaction of both such a query correct-answer condition that the authentication target person correctly answers a query submitted from the information processing SYSc to the authentication target person and such a continuity condition that there is a continuity in the movement of the imaged person, in addition to the collation/verification condition. Thus, the information processing apparatus 2*c* performs a query process in order to determine whether or not the query correct-answer condition is satisfied, and the information processing apparatus 2*c* performs the continuity determination process described above in order to determine whether or not the continuity condition is satisfied. That is, in the third example embodiment, the information processing apparatus 2*c* performs the authentication process including the collation/verification process, the query process, and the continuity determination process.

Specifically, first, the query processing unit 215*c* generates a query to be submitted to the authentication target person by using the query DB 222*c* as a part of the query process (step S31*c*). The query DB 222*c* stores a query record that includes: a registrant; a query whose correct answer is known to the registrant (but which is not easy to answer for a person other than the registrant), and a correct answer of the query. Generally, a plurality of registrants are registered in the information processing system SYSc. For this reason, the query DB 222*c* may store a plurality of query records respectively corresponding to the plurality of registrants. The query processing unit 215*c* extracts, from the query DB 222*c*, a query record corresponding to the registrant who is determined to match the imaged person in the step S23*c*. The query processing unit 215*c* may set the query included in the extracted query record, as the query to be submitted to the authentication target person.

Figure 12:
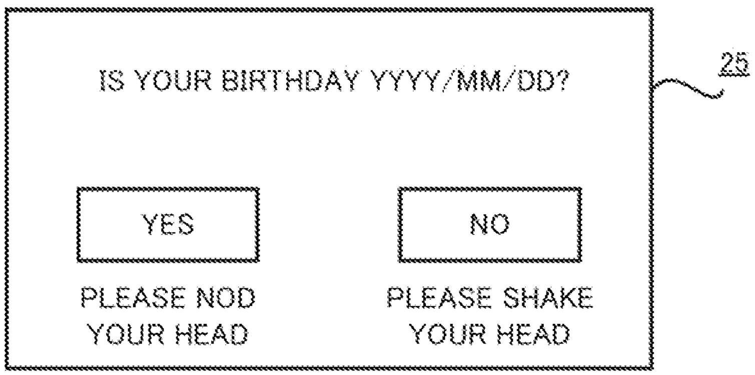
FIG. 12 is a diagram illustrating an example of a query window displayed by the information processing apparatus according to the third example embodiment.

After that, the query processing unit 215*c* outputs the generated query, by using the output apparatus 25, such that the authentication target person who is in front of the camera 1 can recognize the generated query, as a part of the query process (step S31*c*). For example, as illustrated in FIG. 12, when the output apparatus 25 includes a display apparatus, the query processing unit 215*c* may display the generated query, by using the output apparatus 25, such that the authentication target person can visually recognize the generated query. Consequently, the authentication target person answers the query submitted from the information processing apparatus 2*c*.

In the third example embodiment, an answer method of the authentication target person is preferably an answer method that allows the information processing apparatus 2*c* to specify the content of the answer from the person image IMG. Specifically, the answer method of the authentication target person is preferably an answer method that allows the information processing apparatus 2*c* to specify the content from the movement of the imaging person who appears in the person image IMG. As an example, when a yes-or-no query to which either "Yes" or "No" is answered, is submitted from the information processing apparatus 2*c* to the authentication target person, the authentication target person may nod the head to answer "Yes" to the query, while the authentication target person may shake the head to answer "No" to the query. In this case, the information processing apparatus 2*c* is capable of specifying which of "Yes" and "No" is the answer of the authentication target person, from the movements of the imaging person who appears in the person image IMG. For this reason, the query generation unit 215*c* may generate the query that can be answered by the authentication target person, by using the answer method that allows the information processing apparatus 2*c* to specify the content of the answer from the person image IMG. The query record stored by the query DB 222*c* may store the query that can be answered by the authentication target personnel, by using the answer method that allows the information processing apparatus 2*c* to specify the content of the response from the person image IMG. As illustrated in FIG. 12, the query processing unit 215*c* may also output (e.g., display) the answer method, by using the output apparatus 25, such that the authentication target person can recognize the answer method, when the query is outputted.

After the query generated by the query processing unit 215*c* is outputted, the camera 1 images the imaging target range continuously in time series (step S32*c*). That is, the camera 1 performs the imaging process (step S32*c*). The step S32*c* in FIG. 11 may be the same as the step S11 in FIG. 3. Therefore, a detailed description of the step S32*c* in FIG. 11 will be omitted.

In the third example embodiment, in the step S32*c*, the camera 1 images a person who answers the query continuously in time series. As described above, when the authentication target person who is actually in front of the camera 1, is in the imaging target range, the authentication target person possibly answers the query. For this reason, the camera 1 may image the authentication target person who answers the query, continuously in time series, thereby to generate a plurality of person images IMG in which the authentication target person appears as the imaged person. On the other hand, when the display that displays the image of a person (typically, the registrant) who is different from the authentication target person who is actually in front of the camera 1, is in the imaging target range, the person displayed on the display possibly makes a movement to answer the query. For this reason, the camera 1 may image the person displayed on the display continuously in time series, thereby to generate a plurality of person images IMG in which the person displayed on the display appears as the imaged person. The camera 1 transmits the generated person images IMG 1 to the information processing apparatus 2.

Following or in parallel with the imaging process performed by the camera 1 in the step S32*c*, the information processing apparatus 2 performs the query process and the continuity determination process (step S33*c* to step S35*c*). For convenience of explanation, FIG. 3 exemplifies that the information processing apparatus 2*c* performs the query process and the continuity determination process after the imaging process performed by the camera 1. The information processing apparatus 2*c*, however, may perform the query process and the continuity determination process in parallel with the imaging process performed by the camera 1.

In order to perform the query process and the continuity determination process, the feature extraction unit 211 extracts, from each of the plurality of person images IMG generated in the step S32*c*, the feature quantity of the imaging person who appears in the person images IMG (step S33*c*). In particular, the feature extraction unit 211 extracts the feature quantity that can be used to specify the answer to the query from the movement of the imaged person and that can be used to determine whether or not there is a continuity in the movement of the imaged person. Such a feature quantity may be the same as the that extracted in the process in the step S12 in FIG. 3. That is, the feature extraction unit 211 may extract the feature quantity of the imaging person that changes in accordance with the movement of the imaging person. In this case, the step S33*c* in FIG. 11 may be the same as the step S12 in FIG. 3. Therefore, a detailed description of the step S33*c* in FIG. 11 will be omitted.

The feature quantity extracted in the step S33*c* is used to specify the answer to the query from the movement of the imaged person and to determine whether or not there is a continuity in the movement of the imaged person. For this reason, the step S33*c* may be a part of each of the query process and the continuity determination process. That is, the feature extraction unit 211 may perform the step S33*c* as a part of the query process and the continuity determination process.

Then, the query processing unit 215*c* determines whether or not the answer of the imaged person to the query is correct on the basis of the feature quantity extracted in the step S33*c* (step S34*c*). That is, the feature extraction unit 211 performs the step S34*c* as a part of the query process. For example, the query processing unit 215*c* specifies the movement of the imaged person on the basis of the feature quantity extracted in the step S33*c*. After that, the query processing unit 215*c* specifies the answer of the imaged person (i.e., the answer of the authentication target person who is actually in front of the camera 1 or the person displayed on the display) on the basis of the movement of the imaged person. After that, the query processing unit 215*c* determines whether or not the answer of the imaged person to the query is correct, by determining whether or not the specified answer of the imaged person matches the correct answer included in the query record stored in the query DB 222*c*.

Before or after, or in parallel with the step S34*c*, the authentication unit 212 determines whether or not there is a continuity in the movement of the imaged person among the plurality of person images IMG, on the basis of the feature quantity extracted in the step S33*c* (step S35*c*). That is, the feature extraction unit 211 performs the step 35*c* as a part of the continuity determination process. The step S35*c* in FIG. 11 may be the same as the step S13 in FIG. 3. Therefore, a detailed description of the S35*c* in FIG. 11 will be omitted. For convenience of explanation, FIG. 11 exemplifies that the information processing apparatus 2*c* performs the query process in the step S34*c* and then performs the continuity determination process in the step S35*c*. The information processing apparatus 2*c*, however, may perform the query process in the step S34*c* and the continuity determination process in the step S35*c* n parallel. The information processing apparatus 2*c* may perform the continuity determination process in the step S35*c* and then perform the query process in the step S34*c*.

As a result of the determination in the step S34*c*, when it is determined that the answer of the imaged person to the query is not correct (step S34*c*: No), the imaged person (i.e., the authentication target person who is actually in front of the camera 1 or the person displayed on the display) erroneously answers the query to which the registrant supposedly answers correctly. In this case, the person who answers the query (i.e., the authentication target person who is actually in front of the camera 1 or the person displayed on the display) is possibly not the registrant. Therefore, in this case, the authentication unit 212 determines that the authentication target person may pretend to a person (typically, the registrant) who is different from the authentication target person. Consequently, the authentication unit 212 determines that the authentication of the authentication target person is failed (step S15).

As a result of the determination in the step S35*c*, when it is determined that there is no continuity in the movement of the imaged person (step S35*c*: No), the authentication unit 212 determines that the authentication of the authentication target person is failed, as described in the first example embodiment (step S15).

On the other hand, as a result of the determination in the step S34*c* and the step S35*c*, when it is determined that the answer of the imaged person to the query is correct and that there is a continuity in the movement of the imaged person (step S34*c*: Yes, and step S35*c*: Yes), the authentication unit 212 determines that there is no possibility that the authentication target person pretends to be a person who is different from the authentication target person. Consequently, the authentication unit 212 determines that the authentication of the authentication target person is successful (step S14).

As described above, the information processing system SYSc (especially, the information processing apparatus 2*c*) in the third example embodiment is allowed to enjoy the same effects as the effect that can be enjoyed by the information processing system SYSa (especially, the information processing apparatus 2) in the first example embodiment or the information processing system SYSb (especially, the information processing apparatus 2*b*) in the second example embodiment. In particular, the information processing apparatus 2*c* determines that the authentication of the authentication target person is successful, only with the satisfaction of not only the continuity condition that there is a continuity in the movement of the imaged person, which is used in the first example embodiment, but also both the collation/verification condition that the imaged person matches the registrant and the query correct-answer condition that the authentication target person correctly answers the query. Therefore, the information processing apparatus 2*c* is capable of more strictly authenticating the authentication target person under a stricter condition than that in the first example embodiment.

The information processing apparatus 2*c*, however, may determine that the authentication of the authentication target person is successful when the continuity condition and the query correct-answer condition are satisfied, even if the collation/verification condition is not satisfied. In such cases, the information processing apparatus 2*c* does not need to perform the collation/verification process. The information processing apparatus 2*c* may not include the collation/verification unit 214*c* for performing collation/verification process.

In addition, when the continuity condition and the collation/verification condition are satisfied, the information processing apparatus 2*c* may determine that the authentication of the authentication target person is successful even if the query correct-answer condition is not satisfied. In this case, the information processing apparatus 2*c* does not need to perform the query process. The information processing apparatus 2*c* may not include the query processing unit 215*c* to perform the query process.

Instead of the query correct-answer condition, the information processing apparatus 2*c* may use such an arbitrary correct-answer condition that the authentication target person is asked to input the information that is known only to the registrant and that the information inputted by the authentication target person is correct. For example, the information processing apparatus 2*c* may use such a correct-answer condition that the authentication target inputs a correct password or PIN (Personal Identification Number) code.

(4) Modified Example

The camera 1 may include an image pickup device of a global shutter type. The image pickup device of the global shutter type is an image pickup device in which the timing of exposure is the same as the timing of reading of charge in all the pixels of the image pickup device. Alternatively, the camera 1 may include an image pickup device of a rolling shutter type. The image pickup device of the rolling shutter type is an image pickup device in which the exposure and the reading of charges are performed in order for each row from the pixel of an upper row of the image pickup device to the pixel of a lower row. Therefore, in the person image IMG generated by the camera 1 including the image pickup device of the rolling shutter type, there is a distortion (typically, a deviation in a horizontal direction) due to a difference between an exposure time and a reading time. In particular, this distortion may occur remarkably in the person image IMG including a moving person. In this case, the feature quantity of the imaged person that originally should change continuously, changes discontinuously due to the distortion, and the information processing apparatus 2*b* may erroneously determine that the spoofing occurs even though there is no spoofing. Conversely, the feature quantity of the imaged person that originally should change discontinuously, changes continuously due to the distortion, and the information processing apparatus 2*b* may erroneously determine that there is no spoofing under the occurrence of the spoofing. Therefore, when the camera 1 includes the imaging device of the rolling shutter type, the information processing apparatus 2*b* may perform the continuity determination process to eliminate an influence of the distortion. For example, the information processing apparatus 2*b* may perform the continuity determination process to eliminate the influence of the distortion, on the basis of a position relationship between the pixel corresponding to a certain part of the body of the imaged person from which the feature quantity is extracted and the row in which the exposure and the reading of charges are performed.

(4) Supplementary Notes

With respect to the example embodiments described above, the following Supplementary Notes are further disclosed.

[Supplementary Note 1]

An information processing system including:

an imaging apparatus that generates a plurality of images in which a target appears, by imaging the target continuously in time series; and an information processing apparatus that authenticates the target by using at least one of the plurality of images, the information processing apparatus including:

an extraction unit that extracts, from each of the plurality of images, a feature quantity of target that changes in accordance with a movement of the target; and an authentication unit that determines that authentication of the target is failed, when the feature quantity changes discontinuously in time series among the plurality of target images.

[Supplementary Note 2]

The information processing system according to Supplementary Note 1, wherein the information processing apparatus further includes a change unit that is configured to change an imaging rate indicating a number of times that the imaging apparatus images the target range per unit time.

[Supplementary Note 3]

The information processing system according to Supplementary Note 2, wherein the change unit changes the imaging rate from a first imaging rate to a second imaging rate that is different from the first imaging rate, during a period in which the imaging apparatus images a same target, the imaging apparatus images the target at the first imaging rate continuously in time series and then images the same target at the second imaging rate continuously in time series, and the authentication unit determines that the authentication of the target is failed, when at least one of a first condition and a second condition are satisfied, wherein the first condition is a condition that the feature quantity changes discontinuously in time series among the plurality of images generated by imaging the target at the first imaging rate continuously in time series, and the second condition is a condition that the feature quantity changes discontinuously in time series among the plurality of images generated by imaging the target at the second imaging rate continuously in time series.

[Supplementary Note 4]

The information processing system according to any one of Supplementary Notes 1 to 3, wherein the imaging apparatus images the target that moves toward the imaging apparatus, continuously in time series.

[Supplementary Note 5]

An information processing apparatus including:

an extraction unit that extracts, from each of a plurality of images in which a target appears and which are generated by that an imaging apparatus images the target continuously in time series, a feature quantity of the target that changes in accordance with a movement of the target; and an authentication unit that determines that authentication of the target is failed, when the feature quantity changes discontinuously in time series among the plurality of images.

[Supplementary Note 6]

An information processing method including:

generating a plurality of images in which a target appears, by imaging the target continuously in time series;

extracting, from each of the plurality of images, a feature quantity of target that changes in accordance with a movement of the target; and determining that authentication of the target is failed, when the feature quantity changes discontinuously in time series among the plurality of target images.

[Supplementary Note 7]

A recording medium on which a computer program that allows a computer to execute an information processing method is recorded, the information processing method including:

generating a plurality of images in which a target appears, by imaging the target continuously in time series;

extracting, from each of the plurality of images, a feature quantity of target that changes in accordance with a movement of the target; and determining that authentication of the target is failed, when the feature quantity changes discontinuously in time series among the plurality of images.

[Supplementary Note 8]

A computer program that allows a computer to execute an information processing method, the information processing method including:

generating a plurality of images in which a target appears, by imaging the target continuously in time series;

extracting, from each of the plurality of images, a feature quantity of target that changes in accordance with a movement of the target; and determining that authentication of the target is failed, when the feature quantity changes discontinuously in time series among the plurality of images.

This disclosure is not limited to the examples described above and is allowed to be changed, if desired, without departing from the essence or spirit of this disclosure which can be read from the claims and the entire specification. Am information processing system, an information processing apparatus, an information processing method, a computer program and a recording medium with such changes are also intended to be within the technical scope of this disclosure.

To the extent permitted by law, this application claims priority based on Japanese application No. 2020-218564, filed Dec. 28, 2020, the entire disclosure of which is hereby incorporated by reference. Furthermore, to the extent permitted by law, all publications and papers described herein are incorporated herein by reference.

DESCRIPTION OF REFERENCE CODES

SYS information processing system
1 Camera
2 Information processing apparatus
21 Arithmetic apparatus
211 Feature extraction unit
212 Authentication unit
213*b* Rate change unit
214*c* Matching unit
215*c* Query processing unit
IMG person image

What is claimed is:

1. An information processing system comprising:
an imaging apparatus that generates a plurality of images in which a target appears, by imaging the target continuously in a time series; and
an information processing apparatus that authenticates the target by using at least one of the plurality of images, the information processing apparatus including:
at least one memory storing instructions; and
at least one processor configured to execute the instructions to:
extract, from each of the plurality of images, a feature quantity of the target that changes in accordance with a movement of the target, wherein a plurality of feature quantities change along with the time series;
determine that the target is spoofing using a display, when the plurality of the feature quantities change discontinuously in the time series among the plurality of images; and
change an imaging rate indicating a number of times that the imaging apparatus images the target per unit time so that a display rate of the display does not match the imaging rate of the imaging apparatus,
wherein the at least one processor is configured to execute the instructions to determine that the target is spoofing using the display, when an image, in which the feature quantities do not change between two consecutive images, appears in the plurality of images at a constant cycle.

2. The information processing system according to claim 1, wherein
the at least one processor is configured to execute the instructions to change the imaging rate from a first imaging rate to a second imaging rate that is different from the first imaging rate, during a period in which the imaging apparatus images the target,
the imaging apparatus images the target at the first imaging rate continuously in first time series and then images the target at the second imaging rate continuously in second time series, and
the at least one processor is configured to execute the instructions to determine that the authentication of the target is failed, when at least one of a first condition and a second condition are satisfied, wherein the first condition is a condition that the feature quantities change discontinuously in the first time series among the plurality of images generated by imaging the target at the first imaging rate continuously in the first time series, and the second condition is a condition that the feature quantities change discontinuously in the second time series among the plurality of images generated by imaging the target at the second imaging rate continuously in the second time series.

3. The information processing system according to claim 1, wherein the imaging apparatus images the target that moves toward the imaging apparatus, continuously in the time series.

4. The information processing system according to claim 1, wherein the at least one processor is configured to execute the instructions to determine that the target is spoofing using the display, when an image including feature quantities, that cause a deviation amount from a regression curve based on the feature quantities of the plurality of images to increase by a certain amount or more, appears in the plurality of images at a constant cycle.

5. An information processing apparatus comprising:
at least one memory configured to store instructions; and
at least one processor configured to execute the instructions to:
extract, from each of a plurality of images in which a target appears and which are generated by an imaging apparatus that images the target continuously in a time series, a feature quantity of the target that changes in accordance with a movement of the target, wherein a plurality of feature quantities change along with the time series;
determine that the target is spoofing using a display, when the plurality of the feature quantities change discontinuously in the time series among the plurality of images; and
change an imaging rate indicating a number of times that the imaging apparatus images the target per unit time so that a display rate of the display does not match the imaging rate of the imaging apparatus,
wherein the at least one processor is configured to execute the instructions to determine that the target is spoofing using the display, when an image, in which the feature quantities do not change between two consecutive images, appears in the plurality of images at a constant cycle.

6. An information processing method comprising:
generating a plurality of images in which a target appears, by an imaging apparatus that images the target continuously in a time series;
extracting, from each of the plurality of images, a feature quantity of the target that changes in accordance with a movement of the target, wherein a plurality of feature quantities change along with the time series;
determining that the target is spoofing using a display, based on the plurality of the feature quantities changing discontinuously in the time series among the plurality of images; and
changing an imaging rate indicating a number of times that the imaging apparatus images the target per unit time so that a display rate of the display does not match the imaging rate of the imaging apparatus,
wherein the method further comprises determining that the target is spoofing using the display, based on an image, in which the feature quantities do not change between two consecutive images, appearing in the plurality of images at a constant cycle.

* * * * *